United States Patent
Priest et al.

(10) Patent No.: US 9,910,817 B2
(45) Date of Patent: Mar. 6, 2018

(54) APPARATUS, SYSTEM, AND METHOD FOR ALLOWING USB DEVICES TO COMMUNICATE OVER A NETWORK

(71) Applicant: Black Diamond Video, Inc., Richmond, CA (US)

(72) Inventors: Edward Priest, Point Richmond, CA (US); Steve Fielding, Richmond, CA (US); Victor Ionkin, Richmond, CA (US)

(73) Assignee: Black Diamond Video, Inc., Richmond, CA (US)

( * ) Notice: Subject to any disclaimer, the term of this patent is extended or adjusted under 35 U.S.C. 154(b) by 381 days.

(21) Appl. No.: 14/639,066

(22) Filed: Mar. 4, 2015

(65) Prior Publication Data
US 2015/0254193 A1 Sep. 10, 2015

Related U.S. Application Data

(60) Provisional application No. 61/947,938, filed on Mar. 4, 2014.

(51) Int. Cl.
*G06F 13/20* (2006.01)
*G06F 13/42* (2006.01)
*G06F 13/38* (2006.01)

(52) U.S. Cl.
CPC ........ *G06F 13/4286* (2013.01); *G06F 13/385* (2013.01)

(58) Field of Classification Search
CPC .................................................. G06F 3/0488
See application file for complete search history.

(56) References Cited

U.S. PATENT DOCUMENTS

| | | | |
|---|---|---|---|
| 7,149,833 B2 | 12/2006 | McLeod | |
| 7,493,431 B2 | 2/2009 | McLeod | |
| 7,587,536 B2 | 9/2009 | McLeod | |
| 7,818,486 B2* | 10/2010 | McLeod | H04L 69/32 370/402 |
| 8,856,388 B2 | 10/2014 | McLeod | |
| 8,868,792 B2 | 10/2014 | Schultz et al. | |
| 2011/0267273 A1* | 11/2011 | Herlein | G06F 3/04886 345/168 |

* cited by examiner

*Primary Examiner* — Henry Tsai
*Assistant Examiner* — Juanito Borromeo
(74) *Attorney, Agent, or Firm* — Loza & Loza, LLP; Razmig Messerian

(57) ABSTRACT

One feature pertains to an apparatus includes a universal serial bus (USB) communication interface that communicates with at least one USB peripheral device through a USB cable connection. The apparatus also includes a network communication interface that communicates with a communication network. The apparatus also includes a processing circuit that receives USB communication signals from the USB peripheral device, generates network data packets that include USB data based on the USB communication signals, and transmits the network data packets to a receiving device associated with a USB host device through the communication network. The apparatus also serves as a proxy USB host device to the USB peripheral device. The processing circuit may also transmit polling messages to the USB peripheral device at substantially regular time intervals, and receive the USB communication signals from the USB peripheral device in response to the polling messages.

23 Claims, 22 Drawing Sheets

APPARATUS, SYSTEM, AND METHOD FOR ALLOWING USB DEVICES TO COMMUNICATE OVER A NETWORK

CLAIM OF PRIORITY

Field

The present application for patent claims priority to U.S. provisional application No. 61/947,938 entitled "USB Extender Apparatus, System, and Method" filed Mar. 4, 2014, the entire disclosure of which is hereby expressly incorporated by reference.

BACKGROUND

Field

Various features generally relate network communication, and more specifically to apparatuses, systems, and methods that allow USB devices to communicate with one another over long distances (e.g., distances over 5 meters) through a communication network. The apparatuses and systems may also act as matrix switches to allow USB peripheral devices to communicate with a plurality of USB host devices.

Background

Universal Serial Bus (USB) is an industry standard that defines the cables, connectors, and communications protocols used in a bus for connection, communication, and power supply between computers and electronic devices. The design architecture of USB is asymmetrical in its topology, consisting of a host, a plurality of downstream USB ports, and multiple peripheral devices connected in a tiered-star topology. Additional USB hubs may be included in the tiers, allowing branching into a tree structure with up to five tier levels. A USB host may implement multiple host controllers and each host controller may provide one or more USB ports. Up to 127 devices, including hub devices if present, may be connected to a single host controller. USB devices are linked in series through hubs. One hub—built into the host controller—is the root hub.

FIG. 1 illustrates a schematic block diagram of a prior art system 100 employing USB. The system 100 includes a USB host (e.g., personal computer (PC)) 102, a USB peripheral device 104, and a USB cable 106. The host 102 (e.g., host controller) includes one or more USB connector receptacles 108 that are adapted to receive USB connector plugs (e.g., type A connector). The peripheral device 104 may also include a USB connector receptacle 110 that is adapted to receive a USB connector plug (e.g., type B connector). The USB cable 106 couples the USB peripheral device 104 to the USB host 102 and allows for USB communication between the two devices 102, 104. In the illustrated example, the USB cable 106 has a first end 112 that is type A, and a second end 114 that is type B.

Due to limitations of the USB standard (e.g., USB 1.1, USB 2.0), a standard USB cable 106 is generally limited to a length of about 5 meters (for USB 3.0 the limit is about 3 meters). Thus, the USB cable 106 cannot be arbitrarily long such as 20 meters. The reason for the 5 meter limit is due in large part to the maximum allowed round-trip delay of about 1.5 µs between the host 102 and the peripheral device 104. If the USB host 102 commands are unanswered by the USB peripheral device 104 within the allowed time, the host 102 considers the command lost. When adding USB device response time, delays from the maximum number of hubs added to the delays from connecting cables, the maximum acceptable delay per cable amounts to 26 ns. The USB 2.0 specification requires that cable delay be less than 5.2 ns per meter, which is close to the maximum achievable transmission speed for standard copper wire.

However, in some cases the USB peripheral device 104 may need to be located a considerable distance away from the USB host 102 that exceeds 5 meters. For example, in some applications the USB host 102 may be located in a different room from the USB peripheral device 104, or even in a different building altogether. In such cases it may be impossible to send USB commands between the USB host 102 and the USB peripheral device 104 since one cannot arbitrarily lengthen the USB cable connecting the host 102 and device 104 or insert passive USB cable extension cords.

Therefore, there is a need for a systems, apparatuses, and methods that allow one or more USB peripheral devices to communicate with one or more USB hosts over distances greater than 5 meters. There is also a need for USB peripheral devices to seamlessly communicate with a plurality of USB hosts.

SUMMARY

One feature provides an apparatus comprising a universal serial bus (USB) communication interface adapted to communicate with at least one USB peripheral device through a USB cable connection, a network communication interface adapted to communicate with a communication network, and a processing circuit communicatively coupled to the USB communication interface and the network interface, the processing circuit adapted to receive USB communication signals from the USB peripheral device, generate network data packets that include USB data based on the USB communication signals, and transmit the network data packets to a receiving device associated with a USB host device through the communication network. According to one aspect, the apparatus is adapted to serve as a proxy USB host device to the USB peripheral device, and the processing circuit is further adapted to transmit polling messages to the USB peripheral device at substantially regular time intervals, and receive the USB communication signals from the USB peripheral device in response to the polling messages. According to another aspect, the processing circuit is further adapted to determine that the USB communication signals received from the USB peripheral device include at least one no-data response and at least one data-present response, and wherein the USB data included in the generated network data packets is based on the data-present responses and excludes the no-data responses.

According to one aspect, the USB peripheral device is a human interface device (HID). According to another aspect, the USB communication interface is adapted to communicate with a plurality of USB peripheral devices, and the apparatus further comprises a memory circuit having a plurality of destination address modules each adapted to store a network address of one receiving device of a plurality of receiving devices, each destination address module associated with one of the plurality of USB peripheral devices, and wherein the processing circuit is further adapted to receive USB communication signals from the plurality of USB peripheral devices, generate network data packets that include USB data based on the USB communication signals received from the plurality of USB peripheral devices, the network data packets each including the network address stored at the destination address module associated with the USB peripheral device from which the USB communication signals were received, and transmit the network data packets to the network addresses included in the network data packets. According to yet another aspect, the plurality of destination address modules each store a different network address of a different receiving device, the different receiving devices associated with different USB hosts, and the network data packets are transmitted to the different receiving devices through the communication network.

According to one aspect, the apparatus further comprises a memory circuit having at least one destination address module adapted to store a network address of the receiving device, and wherein the processing circuit is further adapted to generate the network data packets to include a destination address matching the network address stored at the destination address module, and transmit the generated network data packets to the destination address. According to another aspect, the processing circuit is further adapted to receive a command to program the destination address module with the network address of the receiving device, the command received from at least one of a terminal associated with the apparatus and/or a server communicatively coupled to the communication network. According to yet another aspect, the terminal is adapted to display a graphical user interface (GUI) that enables a user to enter selections that route USB data from a plurality of USB peripheral devices coupled to the apparatus to a plurality of USB host devices through the communication network, and the processing circuit further adapted to receive the command to program the destination address module with the network address of the receiving device based on one or more selections entered at the GUI.

According to one aspect, the destination address module is associated with the USB peripheral device, and the processing circuit further adapted to transmit a message to a server through the communication network, the message including the network address of the receiving device stored at the destination address module and the USB peripheral device the destination address module is associated with. According to another aspect, the USB peripheral device is a USB keyboard, and the processing circuit is further adapted to receive keyboard stroke data from the USB keyboard, compress the keyboard stroke data using a look up table (LUT) to decrease the number of bytes representing the keyboard stroke data, and wherein the USB data is the compressed keyboard stroke data. According to yet another aspect, the USB peripheral device is a USB mouse, and the processing circuit is further adapted to receive USB mouse data from the USB mouse that includes button-click data and mouse movement data, generate network data packets that include the button-click data, transmit the network data packets that include the button-click data to the receiving device through the communication network immediately after they are generated, accumulate the mouse movement data received for a predefined period of time before generating network data packets that include the accumulated mouse movement data, and transmitting the network data packets that include the accumulated mouse movement data to the receiving device through the communication network.

According to one aspect, the USB peripheral device is a USB mouse, and the processing circuit is further adapted to receive mouse movement data from the USB mouse that includes x-y coordinates indicative of relative movement of the USB mouse, the x-y coordinates having an associated maximum and minimum x-coordinate value and a maximum and minimum y-coordinate value, accumulate the mouse movement data for a predefined period of time, the predefined period of time greater than 5 milliseconds, transmit the accumulated mouse movement data to the receiving device through the communication network when the predefined period of time has lapsed or sooner if the accumulated mouse movement data includes an x-coordinate value equal to either the maximum or minimum x-coordinate value or a y-coordinate value equal to either the maximum or minimum y-coordinate value. According to another aspect, the USB peripheral device is a touchscreen display, and the processing circuit is further adapted to receive touchscreen press/de-press data and touchscreen movement data from the touchscreen display, generate network data packets that include the touchscreen press/de-press data, transmit the network data packets that include the touchscreen press/de-press data to the receiving device through the communication network immediately after they are generated, accumulate the touchscreen movement data received for a predefined period of time before generating network data packets that include the accumulated touchscreen movement data, and transmitting the network data packets that include the accumulated touchscreen movement data to the receiving device through the communication network.

Another feature provides an apparatus comprising a universal serial bus (USB) communication interface adapted to communicate with a USB host device through a USB cable connection, a network communication interface adapted to communicate with a communication network, and a processing circuit communicatively coupled to the USB communication interface and the network interface, the processing circuit adapted to receive network data packets from a transmitting device associated with a USB peripheral device through the communication network, the network data packets including USB data associated with the USB peripheral device, generate USB communication signals that include the USB data, and transmit the USB communication signals to the USB host device. According to one aspect, the apparatus is adapted to serve as a proxy USB peripheral device to the USB host device, and the processing circuit is further adapted to receive polling messages from the USB host device at substantially regular time intervals, and transmit the USB communication signals to the USB host device in response to the polling messages. According to another aspect, the apparatus emulates a composite USB peripheral human interface device (HID) that is adapted to generate and transmit USB communication signals emulating at least one of a USB keyboard, a USB mouse, and/or a USB touchscreen display.

According to one aspect, the USB data included in the network data packets is compressed USB keyboard data, and the processing circuit is further adapted to determine that the compressed USB keyboard data is compressed, reconstruct uncompressed USB keyboard data by de-compressing the compressed USB keyboard data using a reverse look up table (LUT), and generate USB communication signals that include the uncompressed USB keyboard data, and transmit the USB communication signals that include the uncompressed USB keyboard data to the USB host device. According to another aspect, the processing circuit is further adapted to determine that the USB data included in the network data packets is USB mouse data, the USB mouse data including button-click data and mouse movement data, determine that the mouse movement data is temporally compressed according to a predefined periodic time rate, generate USB communication signals that include the mouse movement data, and transmit the USB communication signals that include the mouse movement data to the USB host device according to the predefined periodic time rate.

Another feature provides a system comprising a first universal serial bus extender (USB-X) adapted to couple to at least one universal serial bus (USB) peripheral device, a second USB-X adapted to couple to a USB host device, the second USB-X communicatively coupled to the first USB-X through a packet switching network, wherein the first USB-X is further adapted to serve as a proxy USB host device to the USB peripheral device, receive USB communication signals from the USB peripheral device, generate network data packets that include USB data based on the USB communication signals received, and transmit the network data packets to the second USB-X through the packet switching network. According to one aspect, the second USB-X is further configured to serve as a proxy USB peripheral device to the USB host device, receive the network data packets that include the USB data from the first USB-X, generate USB communication signals that include the USB data, and transmit the USB communication signals to the USB host device. According to another aspect, the first USB-X includes a memory circuit having a destination address module adapted to store a network address of the second USB-X, and wherein the first USB-X is further adapted to generate the network data packets to include the network address stored at the destination address module, and transmit the generated network data packets to the second USB-X based on the network address included in the network data packets.

According to one aspect, the system further comprises a server communicatively coupled to the first USB-X and the second USB-X through the packet switching network, and the server is adapted to receive a request to route USB communication signals from the USB peripheral device to the USB host device, determine that the USB peripheral device is coupled to the first USB-X, determine that the USB host device is coupled to the second USB-X, obtain the network address of the second USB-X, and transmit a command to the first USB-X to program the destination address module with the network address of the second USB-X. According to another aspect, the request is received based on a selection made by a user operating a graphical user interface (GUI) associated with the server. According to yet another aspect the system further comprises a video router communicatively coupled to the first USB-X and the second USB-X through the packet switching network, the video router adapted to route video signal data from the USB host device to a destination display associated with the USB peripheral device, a server communicatively coupled to the first USB-X, the second USB-X, and the video router through the packet switching network, and the server is adapted to determine that the network address of the second USB-X is stored at the destination address module of the first USB-X, determine that the USB peripheral device is coupled to the first USB-X, determine that the USB host device is coupled to the second USB-X, transmit a command to the video router instructing the video router to route the video signal data from the USB host device to the destination display associated with the USB peripheral device.

According to one aspect, the system further comprises a server communicatively coupled to the first USB-X and the second USB-X through the packet switching network, and the server is adapted to transmit a list of network addresses to the first USB-X that the first USB-X is unauthorized to transmit the USB data to. According to another aspect, the system further comprises a server communicatively coupled to the first USB-X and the second USB-X through the packet switching network, and a remote server communicatively coupled to the server through a wide area network (WAN), the remote server adapted to transmit a message to the server instructing the server to conduct a diagnostic routine that determines if the first USB-X, the second USB-X, and/or the server are operating correctly, and receive a response to the message including a diagnostics report that indicates the results of the diagnostic routine.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "USB device" may be either a USB host device or a USB peripheral device.

Figure 1:
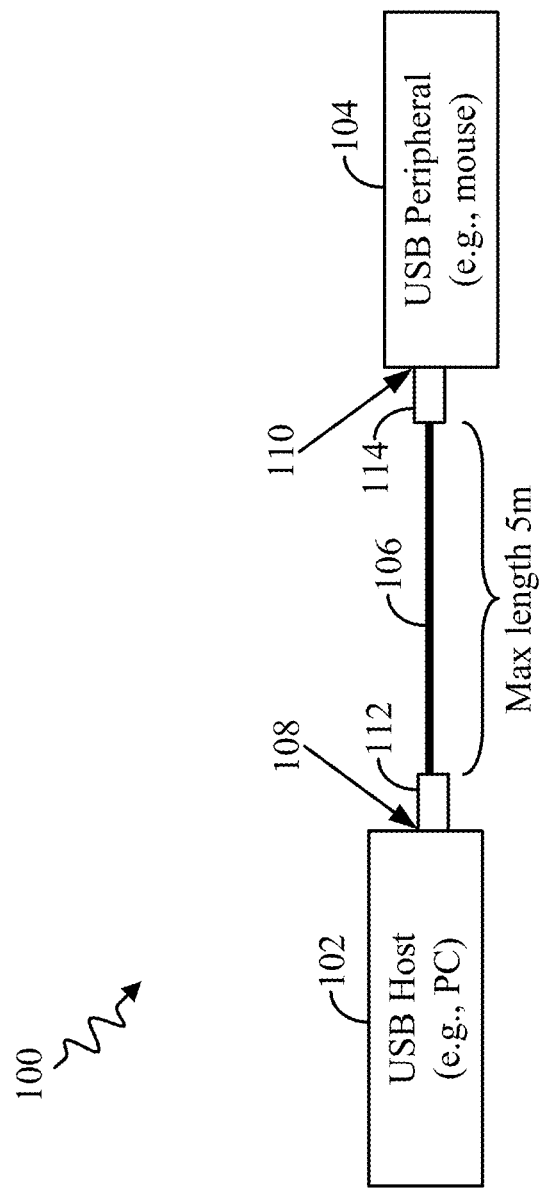
FIG. 1 illustrates a schematic block diagram of a prior art system employing USB communication.
Figure 2:
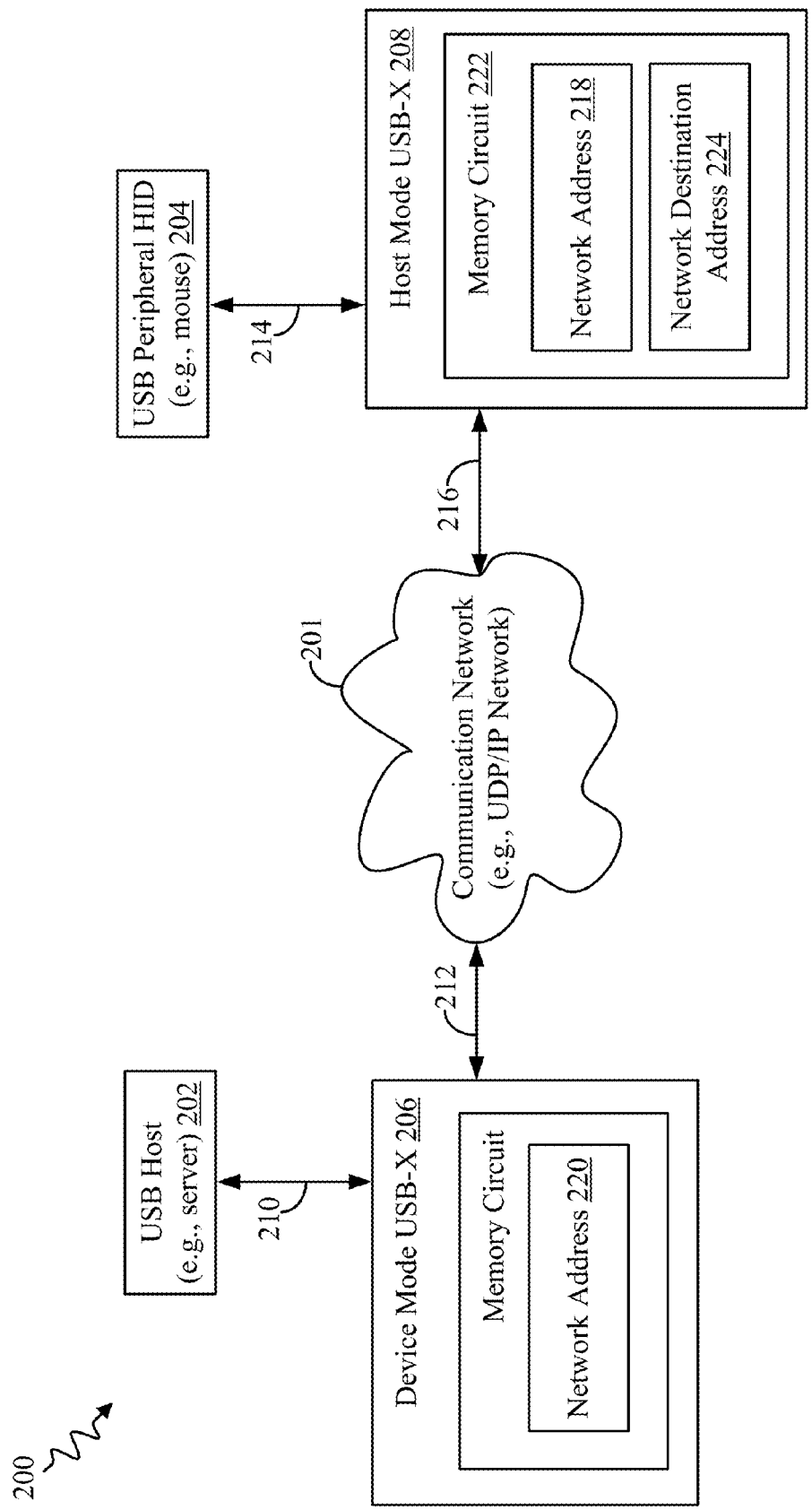
FIG. 2 illustrates a first exemplary high-level schematic block diagram of a communication system for enabling long distance USB signal communication.

Exemplary Communication System Featuring a Single USB Host and Peripheral HID Device Communicating Using USB-X Devices FIG. 2 illustrates a high-level schematic block diagram of a communication system 200 according to one aspect of the disclosure. As will be described in greater detail below, the system 200 and its components allow USB devices to communicate with one another over distances much greater than 5 meters.

In the illustrated example, the system 200 includes a USB host device 202, a USB peripheral human interface device (HID) 204, a first USB extender ("USB-X") device 206, and a second USB-X device 208. The USB host device 202 may be any device that serves as a USB host controller such as, but not limited to, a server, a personal computer, a workstation, a laptop, a mobile device, a smartphone, a USB hub, etc. The USB peripheral HID 204 may be any human interface device that has USB connectivity including, but not limited to, a mouse, a keyboard, a touchscreen display, etc. In the example shown in FIG. 2, it may be assumed that the USB host device 202 is a server and the USB peripheral HID 204 is a mouse.

The USB host device 202 and the USB peripheral device 204 wish to send and receive USB communication signals (e.g., USB packets) to and from one another. For example, a user may wish to utilize the USB mouse 204 to control the server 202. However, the USB mouse 204 may be located too far (e.g., greater than 5 meters away) from the server 202 to send and receive USB communication signals through traditional, direct USB cable connections. For example, the USB mouse 204 may be at a user terminal located in another room or another building that is different from where the server 202 is housed.

In order to solve this problem and enable USB communication between the USB devices 202, 204, the USB-X devices 206, 208 serve as proxy USB devices that relay USB data from the USB peripheral device 204 to the USB host device 202 over a communication network 201. The first USB-X device 206 may operate in a "Device Mode" and as such may be referred to as a "Device Mode USB-X device" and/or a "receiving device." The Device Mode USB-X device 206 is coupled to the USB host device 202 via a standard USB cable connection 210. The Device Mode USB-X device 206 is also communicatively coupled to the communication network 201 through a network communication line 212. The Device Mode USB-X device 206 operates as a proxy USB device in that it mimics a USB peripheral device by receiving and transmitting USB communication signals (e.g., USB packets) from and to the USB host device 202. For example, the Device Mode USB-X device 206 emulates a composite keyboard, mouse, touchscreen, etc. peripheral HID by receiving and transmitting USB mouse, keyboard, touchscreen, etc. communication signals from and to the USB host device 202.

The second USB-X device 208 may operate in a "Host Mode" and as such may be referred to as a "Host Mode USB-X device" and/or a "transmitting device." The Host Mode USB-X device 208 is coupled to the USB peripheral device 204 via a standard USB cable connection 214 and also communicatively coupled to the communication network 201 through a network communication line 216. The Host Mode USB-X device 208 operates as a proxy USB device in that it mimics a USB host device by transmitting and receiving USB communication signals (e.g., USB packets) to and from the USB peripheral device 204.

Some non-limiting, non-exclusive examples of network communication lines 212, 216 may be fiber optic cables and/or twisted pair conductor based cables (e.g., cat5, cat5e, cat6, etc.). The communication network 201 may be any packet switching network. The communication network 201 may be a local area network or a wide area network. According to one example, the communication network 201 operates using the User Datagram Protocol and Internet Protocol (UDP/IP) communication protocols. In other examples, the communication network 201 may be based on other communication protocols (e.g., Transmission Control Protocol (TCP/IP)).

The USB-X devices 206, 208 may allow the USB host device 202 and the USB peripheral device 204 to communicate with one another as follows. The Device Mode USB-X device 206 may receive USB communication signals from the USB host device 202. For example, among other packets, it 206 may receive USB IN tokens from the USB host device 202. In response, the Device Mode USB-X 206 may transmit messages such as null packets in a timely manner to the USB host device 202. For instance, the message responses may be transmitted to the USB host device 202 within a period of time specified by the USB protocol (e.g., less than 1.5 μs for USB 2.0) to prevent the USB host device 202 from reporting a time out error. The USB host device 202 may transmit other USB packets to the Device Mode USB-X 206, the latter of which may respond accordingly in a timely manner. In this fashion, the Device Mode USB-X 206 acts as a proxy USB peripheral device to the USB host device 202.

At the same time the Device Mode USB-X 206 may be receiving and responding to USB communication signals from the USB host device 202, the Host Mode USB-X device 208 may transmit and receive USB communication signals to/from the USB peripheral device 204. For example, among other packets, the Host Mode USB-X 208 may transmit USB IN tokens to the USB peripheral device 204. In response, the USB peripheral device 204 may transmit back, among other things, USB data packets to the Host Mode USB-X 208. For instance, assuming the USB peripheral device 204 is a mouse, the USB peripheral device 204 may respond to the Host Mode USB-X 208 with mouse movement and/or mouse button press data (e.g., "click data", and x-y coordinates associated with mouse movement). In this fashion, the Host Mode USB-X 208 acts as a proxy USB host device to the USB peripheral device 204.

Notably, some or all of the USB data received at the Host Mode USB-X device 208 from the USB peripheral device 204 may be packetized by the Host Mode USB-X 208 in an appropriate format (e.g., network data packets) for transmission to the Device Mode USB-X device 206 over the communication network 201. The packetized data includes network data packets each having control information and payload. The control information may be in the form of a packet header and/or packet trailer, and includes at least in part network source and destination addresses. The payload includes some or all of the USB data (e.g., click data and x-y coordinate data in the case of a mouse) received from the USB peripheral device 204.

The network source address included in the network data packets generated at the Host Mode USB-X device 208 may be the network address 218 (e.g., IP address) of the Host Mode USB-X device 208. The network destination address included in the network data packets generated at the Host Mode USB-X device 208 may be the network address 220 (e.g., IP address) of the Device Mode USB-X device 206. The Host Mode USB-X device's 208 network address 218 (i.e., the source address of the network data packets) may be stored in a memory circuit 222. The Host Mode USB-X device's 208 memory circuit 222 may also include one or more network destination addresses 224 to which network data packets are routed to. In the illustrated example, since the network data packets are to be routed to the Device Mode USB-X 206, the network destination address 224 stored at the Host Mode USB-X device 208 is the network address 220 of the Device Mode USB-X 206. As described in greater detail herein, the network destination addresses 224 may be programmed by a terminal coupled to the Host Mode USB-X 208 and/or servers communicatively coupled to the USB-X device 208 through the communication network 201.

Based on the source and destination addresses, the network data packets including the USB data received from the USB peripheral device are routed through the network from the Host Mode USB-X device 208 to the Device Mode USB-X device 206. Once the Device Mode USB-X device 206 receives the network data packets, it retrieves (e.g., de-packetizes) the USB data stored in the payload of the network data packets and reconstructs USB communication signals that include the USB data. These reconstructed USB communication signals are then transmitted to the USB host device 202 through the USB cable connection 210. Specifically, the USB communication signals may be transmitted to the USB host device 202 through the USB cable connection 210 as responses to USB commands (e.g., in response to IN token, etc.) received from the USB host device 202. The USB host device 202 may receive the USB communication signals having the USB data without ever knowing that the USB data originated and/or is based on data generated at the USB peripheral device 204. Instead, the USB host device 202 may believe the USB communication signals having the USB data originated with the Device Mode USB-X device 206. In this fashion, USB data originating at the USB peripheral device 204 is transmitted to the USB host device 202 through the communication network 201 using the first and second USB-X devices 206, 208 as proxies. Such a scheme effectively allows for USB devices to communicate over distances that greatly exceed 5 meters.

According to one aspect of the disclosure, the USB data received at the Host Mode USB-X device 208 from the USB peripheral device 204 is compressed according to a compression algorithm before it is packetized into network data packets and transmitted through the communication network 201 to the Device Mode USB-X device 206. This may be performed in order to minimize the bandwidth used of the communication network 201 and its resources. For example, the USB peripheral device 204 may frequently generate and transmit to the Host Mode USB-X device 208 a lot of USB communication signals and USB data that is inconsequential (e.g., null packets indicating that the mouse has not moved). The compression algorithm may recognize such inconsequential USB data and not packetize and transmit it to the Device Mode USB-X device 206.

Once received at the Device Mode USB-X device 206, the USB data retrieved from the network data packets is decompressed according to an decompression algorithm. In so doing the original USB communication signal received from the USB peripheral device 204 may be reconstructed at the Device Mode USB-X device 206 and transmitted to the USB host device 202.

Exemplary Protocol Stack

Figure 3:
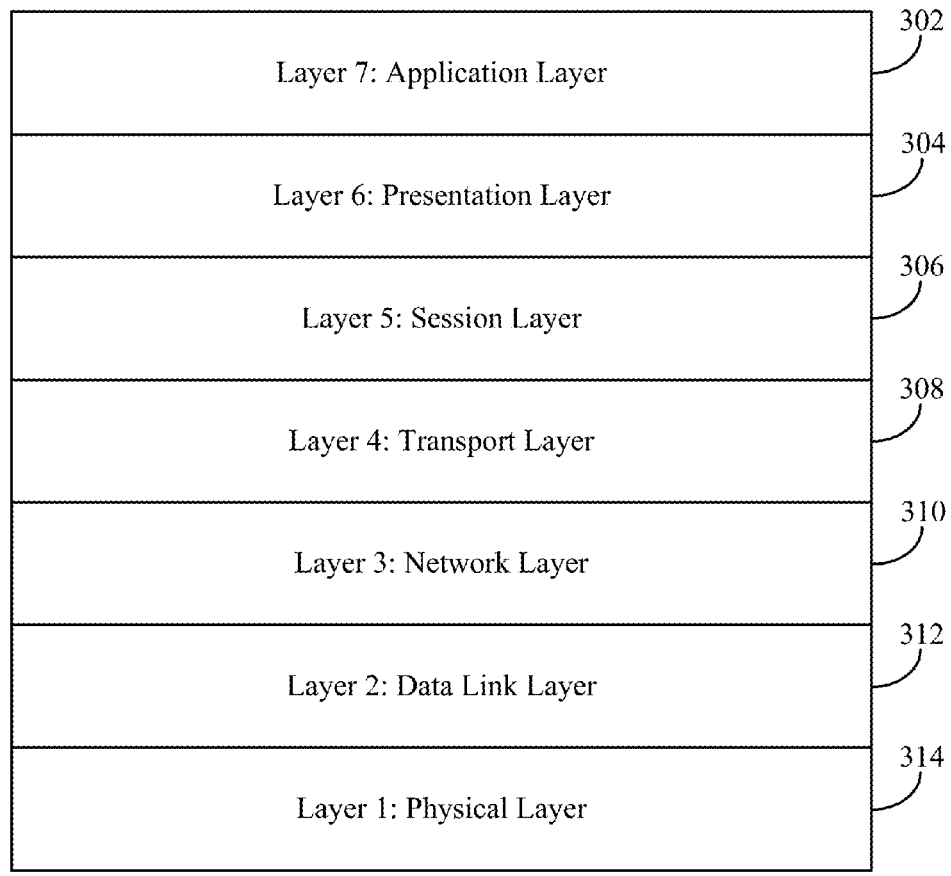
FIG. 3 illustrates an Open System Interconnection model that may be implemented as part of a protocol stack used by network devices for communication in a communication network.

FIG. 3 illustrates an Open System Interconnection (OSI) model 300 that may be implemented as part of a protocol stack used by network devices (e.g., USB-X device, video router, switches, etc.) for communication in the communication network 201. In general, content/data from the higher layers (e.g., where Layer 7 is the highest layer and Layer 1 is the lower layer) of a protocol stack may be encapsulated within the lower layers. As a non-limiting example, aspects of USB-X devices discussed herein may implement a protocol stack based on this OSI model 300.

A Protocol Data Unit (PDU) describes or includes data and its overhead at a particular layer of a protocol stack. Each layer of a protocol stack may have a unique PDU. At the transmitter device, as data is sent down the protocol stack, it is encapsulated at each layer by adding a header and possibly a trailer. At the receiver device, data is de-capsulated as it goes back up the protocol stack.

Layer 1—the Physical Layer—defines, among other things, the electrical and physical specifications of the data connection. It defines the relationship between a device and a physical transmission medium (e.g., a copper or fiber optical cable). This may include the layout of pins, voltages, line impedance, cable specifications, signal timing, hubs, repeaters, network adapters, etc. Examples of the Physical Layer include USB and Digital Subscriber Line (DSL).

Layer 2—the Data Link Layer—may provide node-to-node data transfer; a reliable link between two directly connected nodes, by detecting and possibly correcting errors that may occur in the Physical Layer. The Data Link Layer is divided into two sublayers: the Media Access Control (MAC) layer and the Logical Link Control layer. The MAC layer is responsible for controlling how devices in a network gain access to data and permission to transmit it. The LLC layer controls error checking and packet synchronization. Examples of the Data Link Layer include Point-to-Point Protocol (PPP), IEEE 802.2, and Layer 2 Tunneling Protocol (L2TP).

Layer 3—the Network Layer—may provide the functional and procedural means of transferring variable length data sequences (e.g., datagrams) from one node to another connected to the same network. It translates logical network addresses into physical machine addresses. A network is a medium to which many nodes can be connected, on which every node has an address and which permits nodes connected to it to transfer messages to other nodes connected to it by merely providing the content of a message and the address of the destination node and letting the network find the way to deliver ("route") the message to the destination node. In addition to message routing, the network may (or may not) implement message delivery by splitting the message into several fragments, delivering each fragment by a separate route and reassembling the fragments, report delivery errors, etc. Examples include Internet Protocol version 4 (IPv4), Internet Protocol version 6 (IPv6), and Internet Protocol Security (IPsec).

Layer 4—the Transport Layer—may provide the functional and procedural means of transferring variable-length data sequences from a source to a destination host via one or more networks, while maintaining the quality of service functions. The Transport Layer controls the reliability of a given link through flow control, segmentation/de-segmentation, and error control. Some protocols are state-oriented and connection-oriented meaning that the Transport Layer can keep track of the segments and retransmit those that fail. The Transport Layer may also provide the acknowledgement of successful data transmission and send the next data if no errors occurred. Examples of the Transport Layer include the Transmission Control Protocol (TCP) and the User Datagram Protocol (UDP).

Layer 5—the Session Layer—may control dialogues (e.g., connections) between computers. It may establish, manage, and terminate the connections between the local and remote applications. It provides for full-duplex, half-duplex, or simplex operation, and establishes check-pointing, adjournment, termination, and restart procedures. Examples of the Session Layer include Remote Procedure Call (RPC) and Password Authentication Protocol (PAP).

Layer 6—the Presentation Layer—may establish context between application-layer entities, in which the application-layer entities may use different syntax and semantics if the presentation service provides a big mapping between them. If a mapping is available, presentation service data units are encapsulated into session protocol data units, and passed down the protocol stack. Examples of the Presentation Layer include American Standard Code for Information Interchange (ASCII) and Extended Binary Coded Decimal Interchange Code (EBCDIC).

Layer 7—the Application Layer—is the closest to the end user, which means both the OSI Application Layer and the user interact directly with the software application. The Application Layer interacts with software applications that implement a communicating component. Application-layer functions typically include identifying communication partners, determining resource availability, and synchronizing communication. When identifying communication partners, the application layer determines the identity and availability of communication partners for an application with data to transmit. When determining resource availability, the application layer must decide whether sufficient network or the requested communication exists. Examples of the Application Layer include Hypertext Transfer Protocol (HTTP) and File Transfer Protocol (FTP).

Exemplary Network Data Packet Generation

Figure 4:
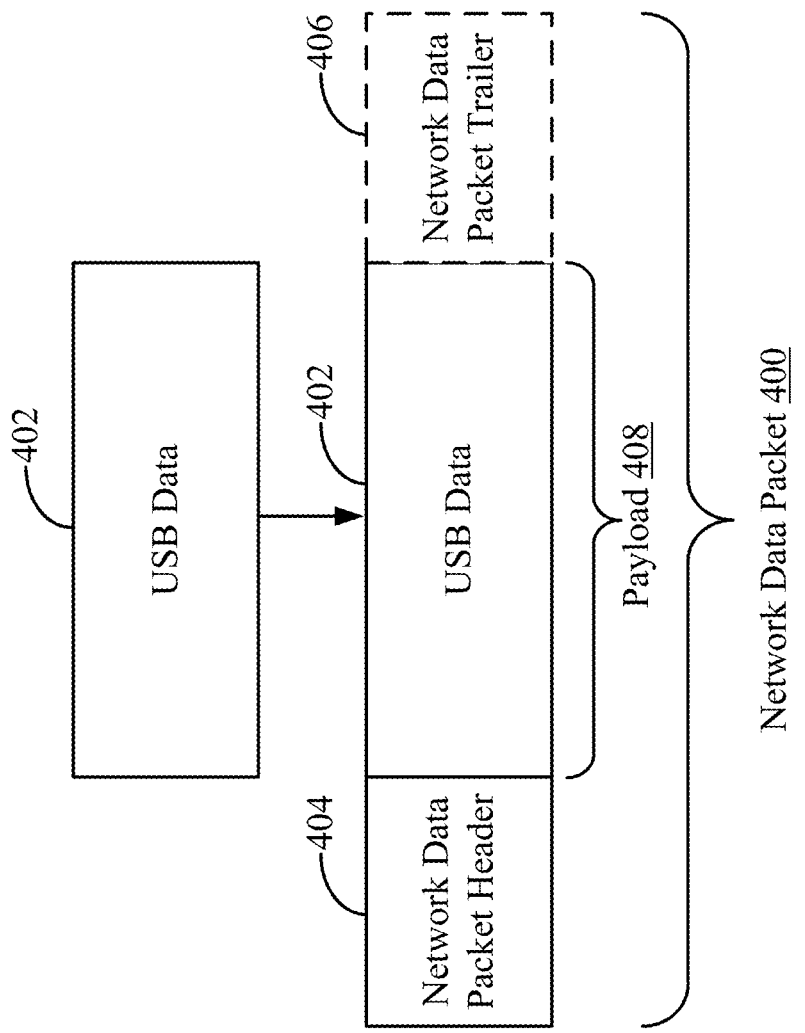
FIG. 4 illustrates a first exemplary conceptual diagram of how USB data may be encapsulated as network data packets for transmission over a communication network.

FIG. 4 illustrates a conceptual diagram of how USB data 402 may be encapsulated as network data packets 400 for transmission over the communication network 201. Referring to FIGS. 2 and 4, USB data 402 may be received at the Host Mode USB-X device 208 from the USB peripheral device 204. In order for the USB data to be transmitted over the communication network it is encapsulated within network data packets (NDPs) 400. The NDPs 400 include control information (e.g., header 404 and optionally trailer 406) and payload 408. The payload 408 of the NDPs 400 include the USB data 402. The header 404 and/or trailer 406 includes source and destination addresses. Among other information, they may also include error detection codes and/or sequencing information. The header 404 shown in FIG. 4 may comprise multiple headers associated with different layers of the protocol stack (e.g., see FIG. 3) used by the communication network 201. Similarly, the trailer 406 may comprise one or more trailers associated with different layers of the protocol stack used by the communication network 201.

Figure 5:
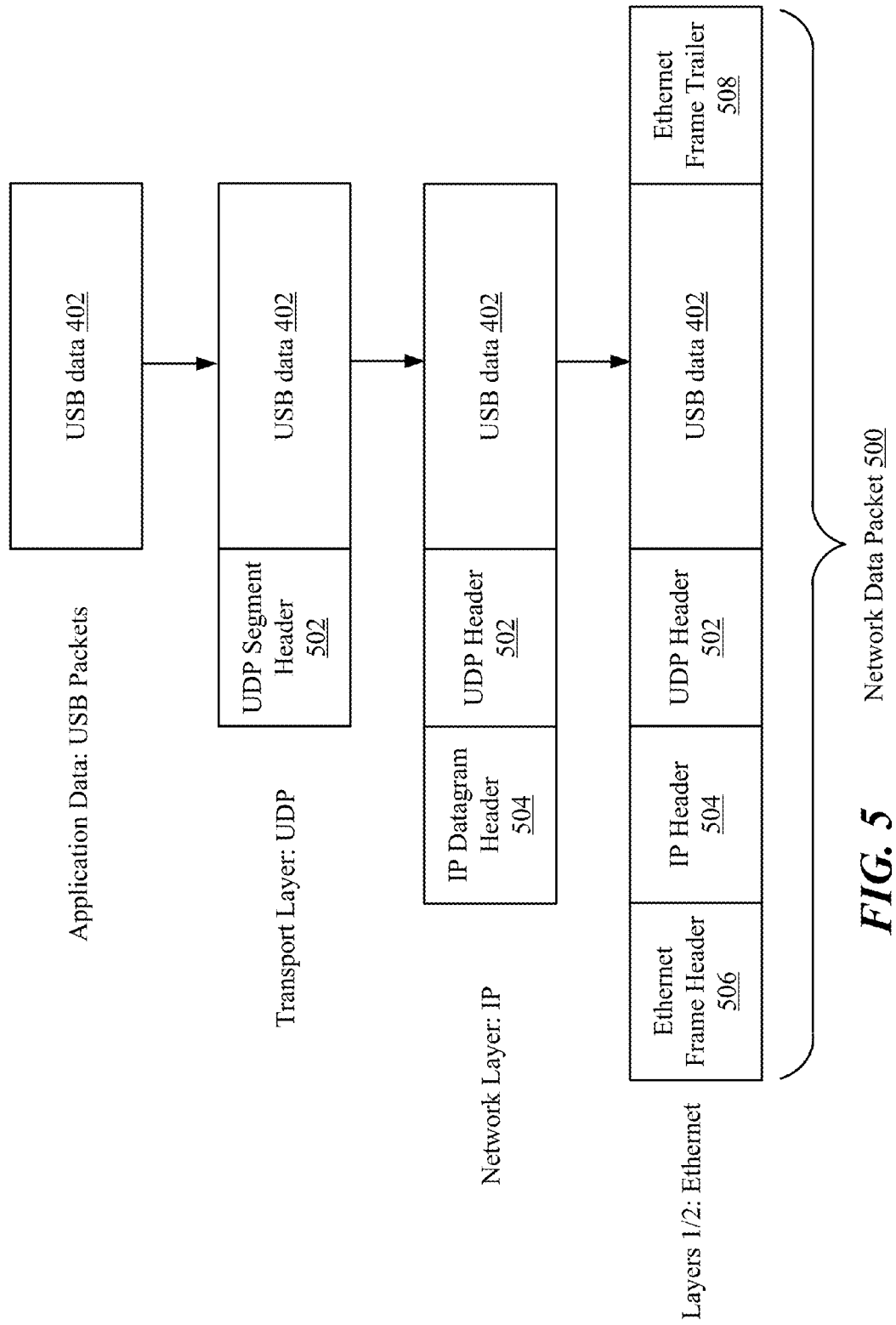
FIG. 5 illustrates a first exemplary conceptual diagram of the structure of a network data packet that includes USB communication signals as part of its payload.

FIG. 5 illustrates an exemplary conceptual diagram of the structure of a network data packet 500 that includes USB communication signals 402 as part of its payload according to one aspect of the disclosure. In this example, the network data packets 500 are generated according to UDP/IP communication protocols. As such, the USB data 402 may be considered the application layer data that is to be transmitted from a source USB device to a destination USB device (e.g., from the USB peripheral device 204 to the USB host device 202) over the communication network 201.

The USB data 402 may first be preceded by a UDP header 502 as part of the Transport Layer to form a segment. Next, the resulting segment may be preceded by an Internet Protocol (IP) header 504 (e.g., IPv4 or IPv6) as part of the Network Layer to form a datagram. The IP header 504 may include the source IP address of the Host Mode USB-X device 208 coupled to the USB peripheral device 204 that is acting as the source of the USB data 402. The IP header 504 may also include the destination IP address of the Device Mode USB-X device 206 coupled to the USB host device 202 that is the destination of the USB data 402. The resulting IP datagram may then be encapsulated by an Ethernet frame header 506 and trailer 508 to form the network data packet 500 ready for transmission over the communication network. In the example shown in FIG. 5, the Ethernet frame header 506, the IP datagram header 504, and the UDP segment header 502 may together be considered the network data packet header (e.g., network data packet header 404 of FIG. 4) and the Ethernet frame trailer 508 may be considered the network data packet trailer (e.g., network data packet trailer 406 of FIG. 4).

Referring to FIGS. 2 and 5, the process described above may be performed by the Host Mode USB-X device 208 after receiving USB communication signals from the USB peripheral device 204 in order to transmit the USB data 402 as network data packets 500 over the communication network 201. The network data packets 500 generated arrive at their destination, which may be the Device Mode USB-X device 206. The Device Mode USB-X device 208 may then work in reverse extracting the USB data embedded as the payload within the network data packets 500. The extracted USB data may then be used to reconstruct USB communication signals that are in turn transmitted to the USB host device 202 via the USB cable 210.

Exemplary Device Mode USB-X Device

Figure 6:
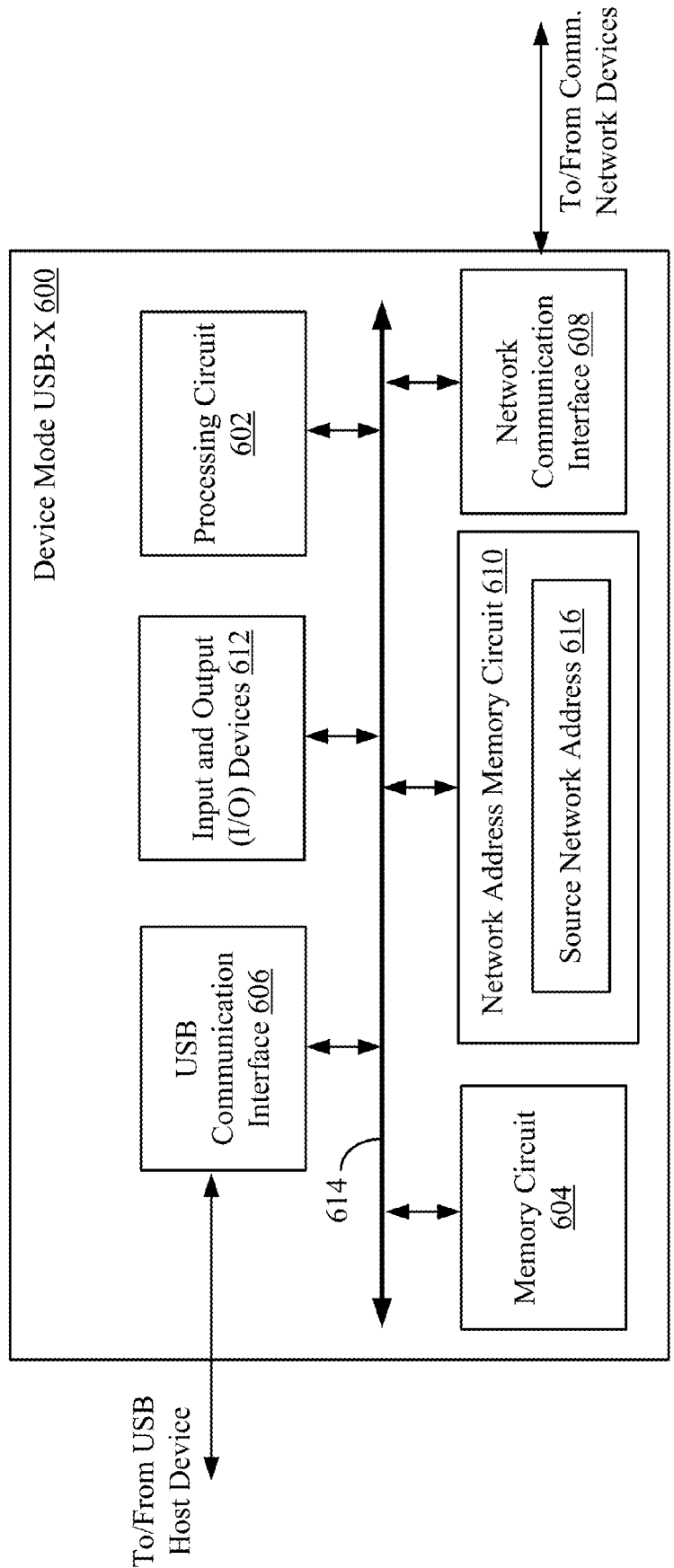
FIG. 6 illustrates a first exemplary schematic block diagram of a Device Mode USB extender device.

FIG. 6 illustrates a schematic block diagram of a Device Mode USB-X device 600 according to one aspect of the disclosure. The Device Mode USB-X 600 shown in FIG. 6 may represent any one of the Device Mode USB-X devices described herein including the Device Mode USB-X devices 206, 804a, 804b . . . 804n shown in FIGS. 2 and 8.

Referring to FIG. 6, the Device Mode USB-X 600 may include at least one processing circuit 602 (e.g., processor(s), application specific integrated circuit(s) (ASICs), field programmable gate array(s) (FPGAs)), at least one memory circuit 604, a USB communication interface 606 (e.g., first communication interface), a network communication interface 608 (e.g., second communication interface), a network address memory circuit 610, and input and output (I/O) devices 612. According to one non-limiting, non-exclusive example, the processing circuit 602, the memory circuit 604, the USB communication interface 606, the network communication interface 608, the network address memory circuit 610, and/or the I/O devices 612 may be communicatively coupled together through a communication bus 614. In other examples, the Device Mode USB-X 600 components 602, 604, 606, 608, 610, 612 may be communicatively coupled to each other through direct and/or indirect signal lines running between them.

The processing circuit 602 may generally execute software instructions stored on the memory circuit 604 and execute many of the processes and calculations performed at the Device Mode USB-X 600. Among other things, the processing circuit 602 may also generate network data packets containing USB data, retrieve USB data stored within network data packets, generate USB communication signals, and decompress compressed USB data retrieved from network data packets to reconstruct USB communication signals.

The memory circuit 604 may include volatile (e.g., static random access memory (SRAM), dynamic random access memory (DRAM), synchronous dynamic random access memory (SDRAM), etc.) and/or non-volatile memory (e.g., flash memory, read only memory, magnetoresistive memory (MRAM), etc.). The memory circuit 604 may store, among other things, software instructions to be executed by the processing circuit 602.

The USB communication interface 606 transmits and receives USB communication signals (e.g., USB packets) to and from a USB host device over a USB cable connection. The USB communication interface 606 includes all the hardware and/or software necessary to generate the USB communication signals on a physical layer level. The network communication interface 608 transmits and receives network data packets to and from communication network devices (e.g., Host Mode USB-X devices, switches, servers, etc.) over a communication network.

The network address memory circuit 610 may include non-volatile and volatile memory circuits. The network address memory circuit 610 stores the network addresses (e.g., IP addresses) of itself and various other networked components associated with a communication network. For example, the network address memory circuit 610 may store its own network address 616 (e.g., source address).

The I/O devices 612 may include one or more buttons that program the source network address 616, reset the Device Mode USB-X 600, power ON/OFF the Device Mode USB-X 600, and/or carry out a self-test that determines whether the Device Mode USB-X 600 is operating correctly. The I/O devices 612 may also include status light emitting diode (LED) indicators that light up and/or blink to indicate different statuses of the Device Mode USB-X 600. Non-exhaustive examples of these statuses may indicate whether the Device Mode USB-X 600 is powered ON/OFF, communicating with a USB host device, communicating with a network device, passed/failed a self-test, etc.

Exemplary Host Mode USB-X Device

Figure 7:
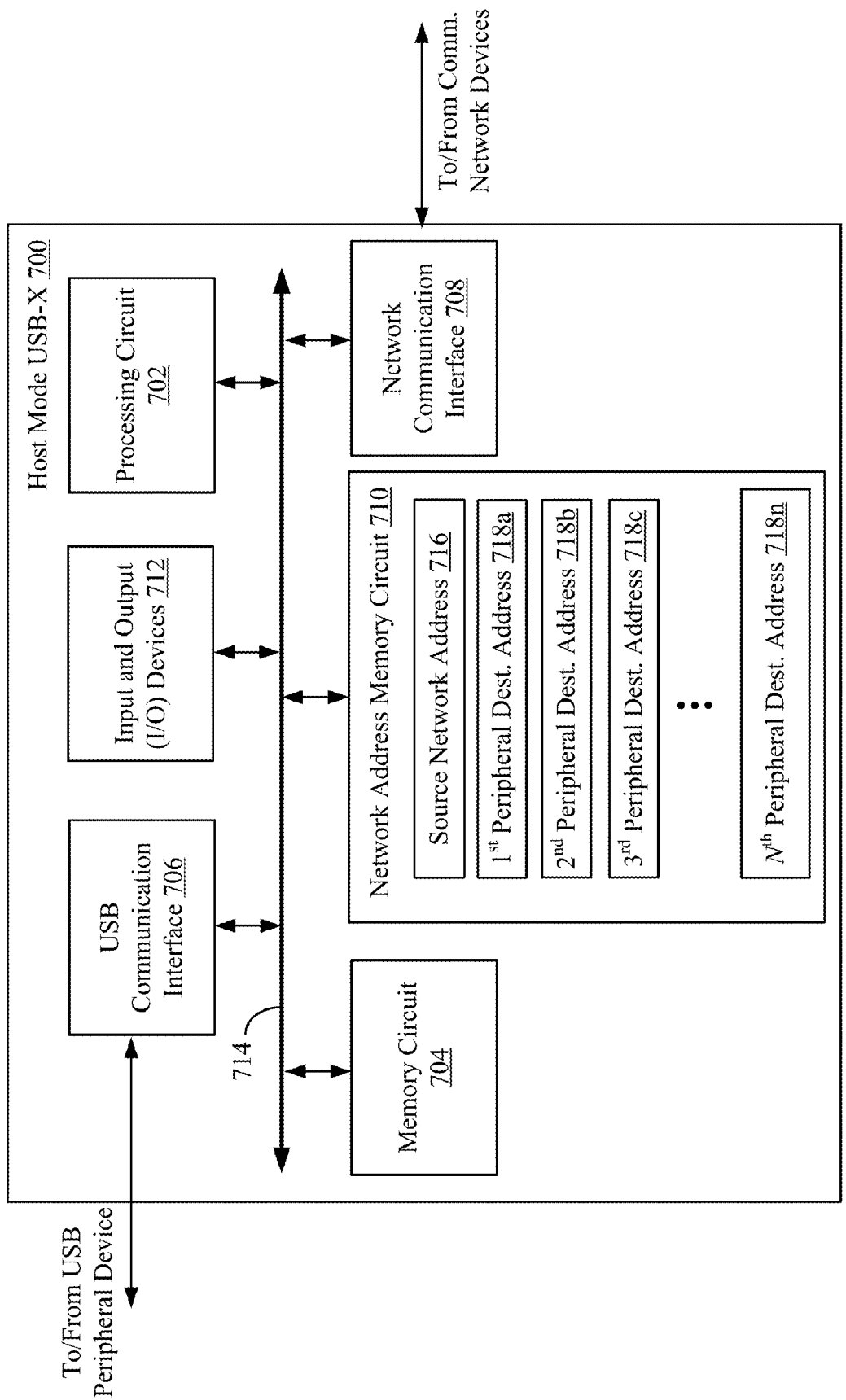
FIG. 7 illustrates a schematic block diagram of a Host Mode USB extender device.

FIG. 7 illustrates a schematic block diagram of a Host Mode USB-X device 700 according to one aspect of the disclosure. The Host Mode USB-X 700 shown in FIG. 7 may represent any one of the Host Mode USB-X devices described herein including the Host Mode USB-X devices 208, 814a, 814b . . . 814n shown in FIGS. 2 and 8.

Referring to FIG. 7, the Host Mode USB-X 700 may include at least one processing circuit 702 (e.g., processor(s), application specific integrated circuit(s) (ASICs), field programmable gate array(s) (FPGAs)), at least one memory circuit 704, a USB communication interface 706 (e.g., first communication interface), a network communication interface 708 (e.g., second communication interface), a network address memory circuit 710, and input and output (I/O) devices 712. According to one non-limiting, non-exclusive example, the processing circuit 702, the memory circuit 704, the USB communication interface 706, the network communication interface 708, the network address memory circuit 710, and/or the I/O devices 712 may be communicatively coupled together through a communication bus 714. In other examples, the Host Mode USB-X 700 components 702, 704, 706, 708, 710, 712 may be communicatively coupled to each other through direct and/or indirect signal lines running between them.

The processing circuit 702 may generally execute software instructions stored on the memory circuit 704 and execute many of the processes and calculations performed at the Host Mode USB-X 700. Among other things, the processing circuit 702 may also generate network data packets containing USB data, retrieve USB data stored within network data packets, generate USB communication signals, and compress USB data before embedding the compressed USB data as payload within network data packets.

The memory circuit 704 may include volatile (e.g., SRAM, DRAM, SDRAM, etc.) and/or non-volatile memory (e.g., flash memory, read only memory, MRAM, etc.). The memory circuit 704 may store, among other things, software instructions to be executed by the processing circuit 702.

The USB communication interface 706 transmits and receives USB communication signals (e.g., USB packets) to and from USB peripheral devices over USB cable connections. The USB communication interface 706 includes all the hardware and/or software necessary to generate the USB communication signals on a physical layer level. The network communication interface 708 transmits and receives network data packets to and from communication network devices (e.g., Device Mode USB-X devices, switches, servers, etc.) over a communication network.

The network address memory circuit 710 may include non-volatile and volatile memory circuits. The network address memory circuit 710 stores the network addresses (e.g., IP addresses) of itself and various other networked components associated with a communication network. For example, the network address memory circuit 710 may store its own network address 716 (e.g., source address). The memory circuit 710 may also store a plurality of network destination addresses 718a-718n of Device Mode USB-X devices that are coupled to USB host devices. The particular network destination addresses 718a-718n stored are associated with the USB peripheral devices the Host Mode USB-X device 700 is coupled to that are providing USB data for transmission over the network to the USB host devices. For example, a first network destination address 718a may be the network destination address of a Device Mode USB-X that is coupled to a USB host device with which a first USB peripheral device wants to communicate with, where the first USB peripheral device is coupled to the Host Mode USB-X device 700. Similarly, a second network destination address 718b may be the network destination address of a Device Mode USB-X that is coupled to a USB host device with which a second USB peripheral device wants to communicate with, where the second USB peripheral device is coupled to the Host Mode USB-X device 700. An N-th network destination address 718n may be the network destination address of a Device Mode USB-X that is coupled to a USB host device with which an N-th USB peripheral device wants to communicate with, where the N-th USB peripheral device is coupled to the Host Mode USB-X device 700.

The I/O devices 712 may include one or more buttons that program the source network address 716, reset the Host Mode USB-X 700, power ON/OFF the Host Mode USB-X 700, and/or carry out a self-test that determines whether the Host Mode USB-X 700 is operating correctly. The I/O devices 712 may also include status light emitting diode (LED) indicators that light up and/or blink to indicate different statuses of the Host Mode USB-X 700. Non-exhaustive examples of these statuses may indicate whether the Host Mode USB-X 700 is powered ON/OFF, communicating with a USB peripheral device, communicating with a network device, passed/failed a self-test, etc.

Figure 8:
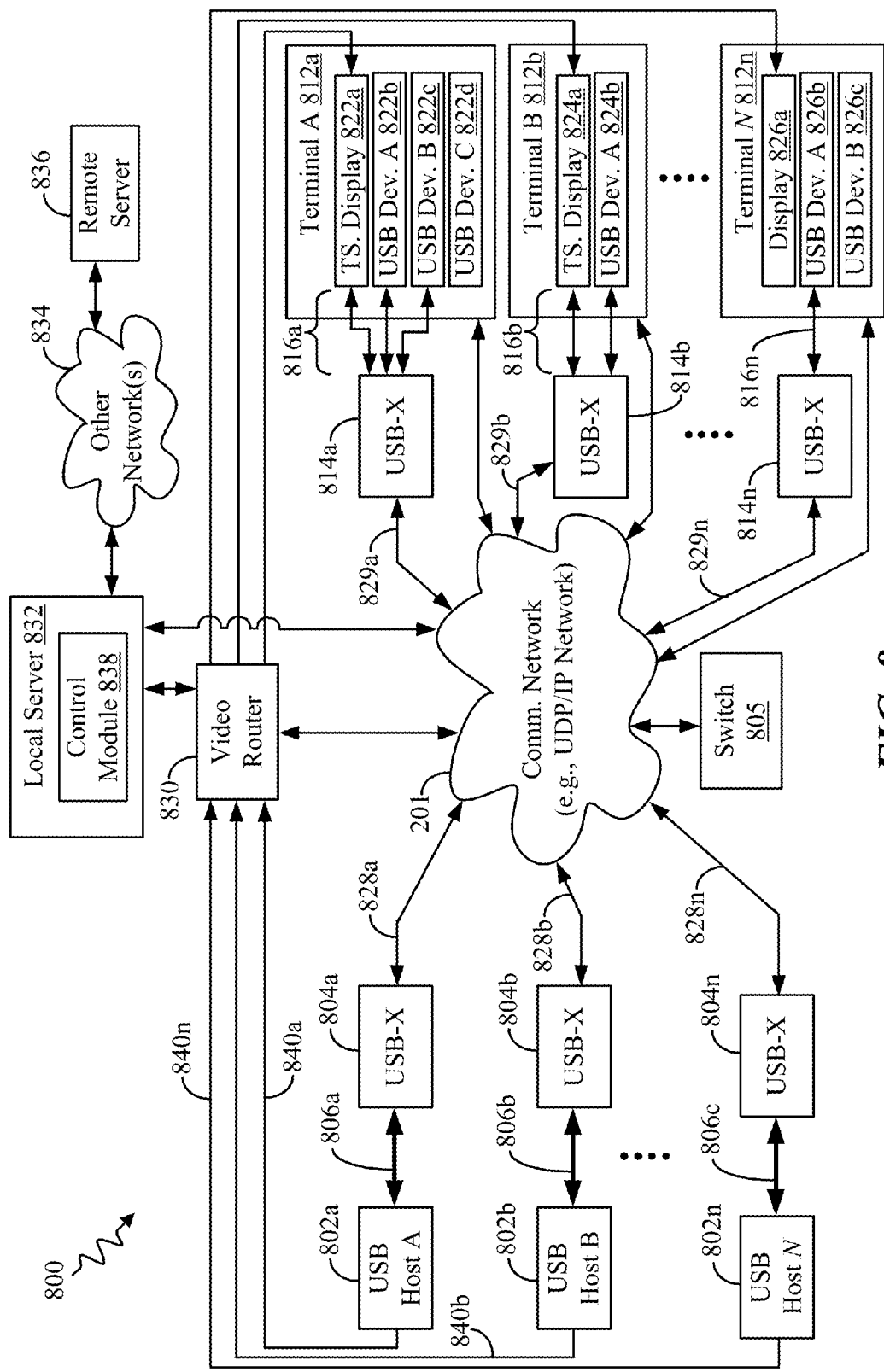
FIG. 8 illustrates a second exemplary schematic block diagram of a communication system for enabling long distance USB signal communication.

Exemplary Communication System Featuring Multiple USB Host and Peripheral Devices Communicating Through a Plurality of USB-X Devices FIG. 8 illustrates a schematic block diagram of a communication system 800 for enabling long distance USB signal communication according to one aspect of the disclosure. The system 800 includes one or more USB host devices (e.g., personal computers, workstations, servers, mobile devices, smartphones, etc. serving as USB host controllers) 802a, 802b . . . 802n and one or more user terminals 812a, 812b . . . 812n. As will be explained in greater detail below, the user terminals 812a, 812b . . . 812n include USB peripheral devices that wish to send USB communication signals (e.g., USB packets) that may include USB commands and USB data to the USB hosts 802a, 802b . . . 802n. However, the USB peripheral devices of the one or more of the user terminals 812a, 812b . . . 812n may be located too far from one or more of the USB host devices 802a, 802b . . . 802n to send and receive USB communication signals through direct USB cable connections. For example, one or more of the user terminals 812a, 812b . . . 812n may be located more than 5 meters from one or more of the host devices 802a, 802b . . . 802n. As such, the USB host devices 802a, 802b . . . 802n and the USB peripheral devices of the terminals 812a, 812b . . . 812n utilize a plurality of USB extender ("USB-X") devices 804a, 804b . . . 804n, 814a, 814b . . . 814n to communicate. The communication network 201 is a packet switching network. As one non-limiting example, the communication network 201 may be a UDP/IP network but instead it may be based on many other LAN and WAN packet switching network communication protocols such as, but not limited to, TCP/IP.

In the illustrated example, each USB host device 802a, 802b . . . 802n is communicatively coupled to a corresponding USB-X device 804a, 804b . . . 804n through a standard USB cable 806a, 806b, 806n. For example, the cables 806a, 806b, 806n may have a type-A connector at a first end connected to the USB host devices 802a, 802b . . . 802n and a type-B connector at a second, opposite end connected to the USB-X devices 804a, 804b . . . 804n. In the example shown, the USB-X devices 804a, 804b . . . 804n communicatively coupled to the host devices 802a, 802b . . . 802n may operate in a "Device" mode of operation. The Device Mode USB-X devices 804a, 804b . . . 804n are communicatively coupled to communication network 201 through network communication lines 828a, 828b . . . 828n, which may be, for example, fiber optic cables and/or twisted pair conductor based cables (e.g., cat5, cat5e, cat6, etc.).

The communication system 800 includes one or more user terminals 812a, 812b . . . 812n that may be communicatively coupled to the communication network 201. The user terminals 812a, 812b . . . 812n may include one or more USB peripheral human interface devices (HID) 822a, 822b, 822c, 824a, 824b, 826b such as, but not limited to mice, keyboards, touchscreen displays, etc. These USB peripheral devices 822a, 822b, 822c, 824a, 824b, 826b may in turn each be communicatively coupled to a corresponding USB-X device 814a, 814b . . . 814n. For example, terminal A 812a may include three (3) USB peripheral HIDs: a touchscreen display 822a, USB device A 822b, and USB device B 822c. USB device A 822b may be a keyboard and USB device B 822c may be a mouse. Terminal A 812a may also include another USB peripheral device 822d that is not an HID such as a solid state drive, optical disk drive, DVD/CD-ROM, flash memory card, etc. The USB peripheral HIDs devices 822a, 822b, 822c may each be communicatively coupled to a single USB-X device 814a through a plurality of separate USB cables 816a.

Similarly, user terminal B's USB peripheral HIDs 824a, 824b are communicatively coupled to another USB-X device 814b through separate, standard USB cables 816b, and user terminal N's USB peripheral HID 826b is communicatively coupled to yet another USB-X device 814n through another standard USB cable 816n. Note that in the example shown, terminal N 812n does not have a touchscreen display, but instead has a regular non-touch display (e.g., flat panel display) that is not coupled to the USB-X device 814n Similar to terminal A, terminal N 812 may include a non-HID USB device 826c such as a solid state drive, optical disk drive, DVD/CD-ROM, flash memory card, etc.

The USB-X devices 814a, 814b . . . 814n communicatively coupled to the USB peripheral HIDs 822a-822c, 824a, 824b, 826b may operate in a "Host" mode of operation and as such may be referred to as "Host Mode USB-X devices." The Host Mode USB-X devices 814a, 814b . . . 814n are communicatively coupled to communication network 201 through network communication lines 829a, 829b . . . 829n, which may be, for example, fiber optic cables and/or twisted pair conductor based cables (e.g., cat5, cat5e, cat6, etc.).

The communication network 201 may be a local area network (LAN) that includes hardware (e.g., switches, routers, etc.) and/or software that controls the flow of information through the network 201. For example, the network 201 may include hardware that assigns each USB-X device 804a, 804b . . . 804n, 814a, 814b . . . 814n a unique network address (e.g., IP address). In some cases such unique network addresses (e.g., also may be referred to herein as "address identifiers") may be manually programmed to each USB-X device 804a, 804b . . . 804n, 814a, 814b . . . 814n. In one non-limiting, non-exclusive example the unique network addresses may be IP addresses.

The network 201 may include a switch 805 that controls the flow of data between USB-X devices 804a, 804b . . . 804n, 814a, 814b . . . 814n based on source and destination addresses of the data it routes. In addition to controlling the flow of data, the switch 805 may supply power to the USB-X devices 804a, 804b . . . 804n, 814a, 814b . . . 814n. For example, the switch 805 may have Power over Ethernet (PoE) capability (e.g., it is a power sourcing equipment (PSE)) so that it supplies each USB-X device 804a, 804b . . . 804n, 814a, 814b . . . 814n with power (e.g., 15.4 Watts). In other aspects, the one or more of the USB-X devices 804a, 804b . . . 804n, 814a, 814b . . . 814n may derive their power from a mains power supply (e.g., plugged into an AC outlet) or be battery powered.

The Device Mode USB-X devices 804a, 804b . . . 804n act as proxy USB peripheral devices as they receive and send USB communication signals from and to the individual USB host devices 802a, 802b ... 802n that they are coupled to via USB cables 806a, 806b ... 806n. For example, among other USB packets, the Device Mode USB-X devices 804a, 804b ... 804n 206 may receive USB IN tokens from the USB host devices 802a, 802b ... 802n. In response, the Device Mode USB-X devices 804a, 804b ... 804n may transmit messages such as null packets in a timely manner to the USB host devices 802a, 802b ... 802n. For instance, the message responses may be transmitted to the USB host devices 802a, 802b ... 802n within a period of time specified by the USB protocol (e.g., less than 1.5 μs for USB 2.0) to prevent the USB host devices 802a, 802b ... 802n from reporting a time out error. The USB host devices 802a, 802b ... 802n may transmit other USB packets to the Device Mode USB-X devices 804a, 804b ... 804n, the latter of which may respond accordingly in a timely manner. In this fashion, the Device Mode USB-X devices 804a, 804b ... 804n act as a proxy USB peripheral devices to the USB host devices 802a, 802b ... 802n. That is, the Device Mode USB-X devices 804a, 804b ... 804n emulate composite USB peripheral HIDs (e.g., keyboard, mouse, touchscreen, etc. devices) by receiving and transmitting USB mouse, keyboard, touchscreen, etc. communication signals from and to the USB host devices 802a, 802b ... 802n.

At the same time the Device Mode USB-X devices 804a, 804b ... 804n may be receiving and responding to USB communication signals from the USB host devices 802a, 802b ... 802n, the Host Mode USB-X devices 814a, 814b ... 814n may transmit and receive USB communication signals to and from the USB peripheral devices 822a-822c, 824a, 824b, 826b. For example, among other packets, the Host Mode USB-X devices 814a, 814b ... 814n may transmit USB IN tokens to the USB peripheral devices 822a-822c, 824a, 824b, 826b. In response, the USB peripheral devices 822a-822c, 824a, 824b, 826b may transmit back, among other things, USB data packets to the Host Mode USB-X devices 814a, 814b ... 814n. In this fashion, the Host Mode USB-X devices 814a, 814b ... 814n act as a proxy USB host devices to the USB peripheral devices 822a-822c, 824a, 824b, 826b.

Some or all of the USB data received at the Host Mode USB-X devices 814a, 814b ... 814n from the USB peripheral devices 822a-822c, 824a, 824b, 826b may be packetized by the Host Mode USB-X devices 814a, 814b ... 814n as network data packets (see, for example, FIGS. 3-5) for transmission to the Device Mode USB-X devices 804a, 804b ... 804n over the communication network 201. For example, if the network 201 is a UDP/IP based network then the Host Mode USB-X devices 814a, 814b ... 814n may packetize the USB data according to the protocols described above with respect to FIG. 5 above. Thus, the payload of the network data packets may include the USB data to be transmitted and the control information (e.g., header/trailer) may include the source and destination addresses of the packets.

The network source address included in the network data packets generated at the Host Mode USB-X devices 814a, 814b ... 814n may be the network address (e.g., IP address) of the Host Mode USB-X devices 814a, 814b ... 814n generating the network data packets. The network destination address included in the network data packets generated at the Host Mode USB-X devices 814a, 814b ... 814n may be the network address (e.g., IP address) of the Device Mode USB-X devices 804a, 804b ... 804n to which the network data packets are destined. The source and destination network addresses to be included in the network data packets may be stored in memory circuits at the Host Mode USB-X devices 814a, 814b ... 814n.

Based on the source and destination addresses, the network data packets including the USB data received from the USB peripheral devices 822a-822c, 824a, 824b, 826b are routed through the network 201 from the Host Mode USB-X devices 814a, 814b ... 814n to the Device Mode USB-X devices 804a, 804b ... 804n. Once the Device Mode USB-X devices 804a, 804b ... 804n receive the network data packets, they retrieve (e.g., de-packetizes) the USB data stored in the payload of the network data packets and reconstruct USB communication signals that include the USB data. These reconstructed USB communication signals may then transmitted to the USB host devices 802a, 802b ... 802n through the USB cable connections 806a, 806b ... 806n. Specifically, the USB communication signals may be transmitted to the USB host devices 802a, 802b ... 802n through the USB cable connections 806a, 806b ... 806n as responses to USB commands (e.g., in response to IN token, etc.) received from the USB host devices 802a, 802b ... 802n. The USB host devices 802a, 802b ... 802n may receive the USB communication signals having the USB data without ever knowing that the USB data originated and/or is based on data generated at the USB peripheral devices 822a-822c, 824a, 824b, 826b. Instead, the USB host devices 802a, 802b ... 802n may believe the USB communication signals having the USB data originated with the Device Mode USB-X devices 804a, 804b ... 804n. In this fashion, USB data originating at the USB peripheral devices 822a-822c, 824a, 824b, 826b are transmitted to the USB host devices 802a, 802b ... 802n through the communication network 201 using the USB-X devices 804a, 804b ... 804n, 814a, 814b ... 814n as proxies.

For example, a user operator may be physically located at user terminal A 812a and desire to access information located at host A 802a. For example, host A 802a may be a picture archiving and communication system (PACS) server that contains medical image data associated with patient records that the user needs to access from terminal A 812a, which may be located in, for example, a hospital operating room. The PACS server 802a may be located in another room of the hospital or in a different building altogether from the location of the operating room's terminal A 812a. Thus, a touchscreen monitor 822a, a keyboard 822b, and/or a mouse 822c at terminal A 812a cannot be directly connected to the PACS server 802a by standard USB cabling. Instead, the terminal's USB touchscreen 822a, keyboard 822b, and/or mouse 822c may be communicatively coupled to the Host Mode USB-X device 814a via USB cables 816a.

According to one aspect of the disclosure, terminal A 812 enables the user to access software that allows the user to select host A 802a thereby indicating that the user desires to control host A 802a with its HID peripheral devices 822a, 822b, 822c. The selection may cause the Host Mode USB-X device 814a to store the network address of the Device Mode USB-X 804a in its network address memory circuit 710 as the destination address 718a-718n that network data packets generated from USB data received from the peripheral devices 822a, 822b, 822c will be routed to.

For example, since USB data received from peripheral device A 822a needs to be routed to host A 802a via the Device Mode USB-X 804a, the network address of the Device Mode USB-X 804a coupled to host A 802a is programmed into the Host Mode USB-X device's 814a $1^{st}$ destination address 718a module, which is associated with peripheral device A 822a. The network address stored in the $1^{st}$ destination address 718a module will later be used and included as the destination address of the network data packets generated at the Host Mode USB-X device 814*a* for USB data received from USB peripheral device A 822*a*.

Similarly, since USB data received from peripheral devices B and C 822*b*, 822*c* also need to be routed to host A 802*a* via the Device Mode USB-X 804*a*, the network address of the Device Mode USB-X 804*a* coupled to host A 802*a* is programmed into the Host Mode USB-X device's 814*a* $2^{nd}$ and $3^{rd}$ destination address modules 718*b*, 718*c*, which are associated with peripheral devices B and C 822*b*, 822*c*, respectively. The network addresses stored in the $2^{nd}$ and $3^{rd}$ destination address modules 718*b*, 718*c* will later be used and included as the destination addresses of the network data packets generated at the Host Mode USB-X device 814*a* for USB data received from USB peripheral devices B and C 822*b*, 822*c*, respectively.

In the example described above, the USB data of all three peripheral devices A, B, and C 822*a*-822*c* is routed to host A 802*a* via the Device Mode USB-X 804*a*, and consequently the destination addresses 718*a*-718*n* stored in the Host Mode USB-X device's 814*a* network address memory circuit 710 are that of the Device Mode USB-X 804*a* coupled to host A 802*a*. However, in other examples it may be desirable to a user to route the USB data from the three peripheral devices A, B, and C 822*a*-822*c* to different USB host devices 802*a*, 802*b* . . . 802*n*. For instance, the user may desire to route USB data from peripheral devices A and B 822*a*, 822*b* to host A 802*a* and USB data from peripheral device C 822*c* to host B 802*b*. In such a case, the USB data from peripheral devices A and B 822*a*, 822*b* may be routed to host A 802*a* as described above. For peripheral device C 822*c*, however, the $3^{rd}$ destination address module in the Host Mode USB-X device's 814*a* network address memory circuit 710 is programmed with the network address of the Device Mode USB-X 804*b* coupled to host B 802*b*. This way network data packets generated at the Host Mode USB-X device 814*a* that include USB data from USB peripheral device C 822*c* include the destination address of the Device Mode USB-X 804*b* coupled to host B 802*b*. Consequently, incoming USB data at the Host Mode USB-X 814*a* from USB peripheral devices A and B 822*a*, 822*b* is routed to host A 802*a* since the network data packets generated that include this USB data have destination addresses associated with the Device Mode USB-X 804*a* coupled to host A 802*a*. By contrast, incoming USB data at the Host Mode USB-X 814*a* from USB peripheral device C 822*c* is routed to host B 802*b* since the network data packets generated that include this USB data have a destination address associated with the Device Mode USB-X 804*b* coupled to host B 802*b*.

Returning now to the example described above where a user at terminal A 812*a* desires to control host A 802*a* with terminal A's USB peripheral HIDs 822*a*-822*c*, the Host Mode USB-X device 814*a* may transmit USB communication signals (e.g., IN token packets among other things) to the USB peripheral devices 822*a*-822*c* over the USB cable connections 816*a*. In response the USB peripheral devices 822*a*-822*c* may transmit USB data to the Host Mode USB-X device 814*a*. For example, this USB data may include: data pertaining to touchscreen actions like scrolling/swiping and tapping; data pertaining to keyboard strokes; and/or data pertaining to mouse movements (e.g., x-y coordinates) and mouse button clicks.

The Host Mode USB-X device 814*a* receives the USB data from the USB peripheral devices 822*a*-822*c* and generates network data packets that include some or all of the USB data received. The network data packets may be generated for transmission over the communication network 201 according to the protocol stack and encapsulation processes described above with respect to FIGS. 3-5. As noted above, the network data packets generated include the destination address of the Device Mode USB-X device 804*a* coupled to (e.g., servicing) host A 802*a*.

According to some aspect of the disclosure herein, the Host Mode USB-X device 814*a* may compress the USB data received from the USB peripheral devices 822*a*-822*c* according to a compression algorithm before generating network data packets. For instance, the Host Mode USB-X device 814*a* may ignore USB data that is consequential such as USB data that represents no change at the USB peripheral devices (e.g., if a mouse as not moved or a key on the keyboard has not been struck, etc.). Instead the Host Mode USB-X device 814*a* may generate network data packets that include USB data representing actual change occurring at the USB peripheral devices 822*a*-822*c*.

Notwithstanding any USB data compression, the network data packets generated at the Host Mode USB-X device 814*a* are transmitted to the Device Mode USB-X device 804*a* associated with (e.g., coupled to) host A 802*a*.

The Device Mode USB-X device 804*a* receives the network data packets and retrieves the USB data stored therein as the payload of the network data packets. If the USB data is compressed, the Device Mode USB-X device 804*a* decompresses the USB data and reconstructs the original USB communication signals. The Device Mode USB-X device 804*a* then transmits reconstructed USB communication signals to host A 802*a* through the USB cable connection 806*a*. Specifically, the USB communication signals may be transmitted to host A 802*a* through the USB cable connection 806*a* as responses to USB commands (e.g., in response to IN token, etc.) received from host A 802*a*.

During times when the Device Mode USB-X 804*a* is not actively receiving network data packets that include USB data from the Host Mode USB-X devices 814*a*, 814*b* . . . 814*n*, it may receive USB communication signals from host A 802*a*. For example, among other packets, the Device Mode USB-X device 804*a* may receive USB IN tokens from host A 802*a*. In response, the Device Mode USB-X 804*a* may transmit messages such as null packets in a timely manner to host A 802*a*. For instance, the message responses may be transmitted to host A 802*a* within a period of time specified by the USB protocol (e.g., less than 1.5 µs for USB 2.0) to prevent host A 802*a* from reporting a time out error. Host A 802*a* may transmit other USB packets to the Device Mode USB-X 804*a*, the latter of which may respond accordingly in a timely manner. In this fashion, the Device Mode USB-X 804*a* acts as a proxy USB peripheral device to host A 802*a*.

In the example described above, the user at terminal A 812*a* transmits USB data to host A 802*a*. However, the user may instead transmit USB data generated at terminal A's peripheral devices 822*a*-822*c* to any one of the other USB host devices 804*b* . . . 804*n*—assuming the user and/or terminal A 812*a* has authorized access.

Figure 9:
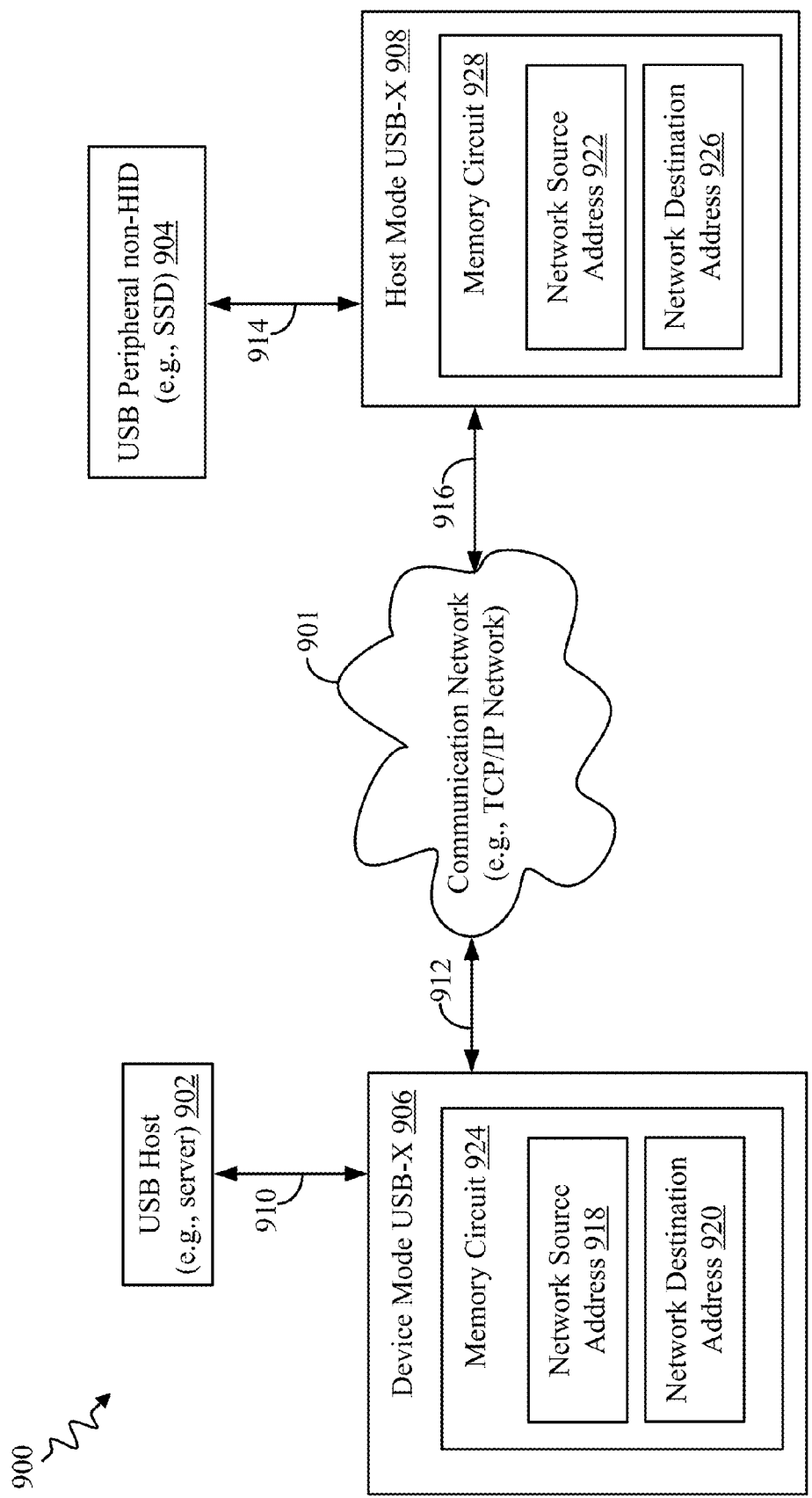
FIG. 9 illustrates a third exemplary high-level schematic block diagram of a communication system for enabling long distance USB signal communication.

Exemplary Communication Systems Featuring USB Hosts and USB Peripheral Non-HID Devices Communicating Using USB-X Devices FIG. 9 illustrates a high-level schematic block diagram of a communication system 900 according to one aspect of the disclosure. As will be described in greater detail below, the system 900 and its components allow USB devices to communicate with one another over distances much greater than 5 meters.

In the illustrated example, the system 900 includes a USB host device 902, a USB peripheral non-HID 904, a Device Mode USB-X Device 906, and a Host Mode USB-X device 908. The USB host device 902 may be any device that serves as a USB host controller such as, but not limited to, a server, a personal computer, a workstation, a laptop, a mobile device, a smartphone, a USB hub, etc. The USB peripheral non-HID 904 is a USB peripheral device that is not a human interface device. Thus, the USB peripheral device 904 may be, but is not limited to, a camera, a microphone, a solid state drive (e.g., flash drive), a DVD drive, a CD drive, a printer, a speaker, etc. In the example shown in FIG. 9, it may be assumed that the USB host device 902 is a server and the USB peripheral HID 904 is a solid state drive (SSD).

The USB host device 902 and the USB peripheral device 904 wish to send and receive USB communication signals (e.g., USB packets) to and from one another. For example, a user may wish to copy data to the SSD 904 from the server 902. However, the SSD 904 may be located too far (e.g., greater than 5 meters away) from the server 902 to send and receive USB communication signals through traditional, direct USB cable connections. For example, the SSD 904 may be at a user terminal located in another room or another building that is different from where the server 902 is housed.

In order to solve this problem and enable USB communication between the USB devices 902, 904, the Device Mode and Host Mode USB-X devices 906, 908 serve to relay the USB devices' 902, 904 USB communication signals to the USB devices 902, 904 over the communication network 901. Specifically, the Device Mode USB-X device 906 operates in a "Device" mode of operation where it is coupled to the USB host device 902 via a standard USB cable connection 910. The Device Mode USB-X device 906 may also be communicatively coupled to the communication network 901 through a network communication line 912.

Similarly, the Host Mode USB-X device 908 may operate in a "Host" mode of operation where it is coupled to the USB peripheral device 904 via a standard USB cable connection 914, and is also communicatively coupled to the communication network 901 through a network communication line 916. Some non-limiting, non-exclusive examples, of network communication lines 912, 916 may be fiber optic cables and/or twisted pair conductor based cables (e.g., cat5, cat5e, cat6, etc.). The communication network 901 may be a local area network or a wide area network. According to one example, the communication network 901 operates using the Transmission Control Protocol (TCP/IP) communication protocols. The TCP/IP network may be better suited for data exchange between a USB host 902 and a non-HID USB peripheral 904, such as an SSD, since it allows for better error detection and/or correction than a UDP/IP network.

The Device Mode USB-X device 906 may receive USB communication signals from the USB host device 902 and packetize (e.g., re-packetize) them for transmission over the communication network 901. The Device Mode USB-X device 906 may then generate network data packets each having control information (e.g., header and/or trailer) and a payload. The payload of each network data packet contains, at least in part, the USB communication signals, and the control information contains, at least in part, source and destination addresses. In this case, the control information, which may be a header, may contain a source address 918 associated with the Device Mode USB-X device 906 and a destination address 920 associated with the Host Mode USB-X device's network address 922 (i.e., its own source address 922). The source address 918 and the destination address 920 may be stored in a memory circuit 924 (e.g., flash memory) of the Device Mode USB-X device 906. The destination address 920 is programmed to be that of the Host Mode USB-X device 908 because the USB peripheral device 904 is coupled to and being served by the Host Mode USB-X device 908. The Device Mode USB-X device 906 may then transmit the network data packets, which include the USB communication signals, to the Host Mode USB-X device 908 through the communication network 901. The Device Mode USB-X device 906 may also timely respond to USB communication signals necessitating a reply (e.g., IN token packet) received from the USB host device 902 so as to avoid time out errors at the USB host device 902.

The Host Mode USB-X device 908 receives the network data packets transmitted by the Device Mode USB-X device 906. The Host Mode USB-X device 908 retrieves (e.g., de-packetizes) the USB communication signals stored in the payloads of the network data packets and then forwards the USB communication signals to the USB peripheral device 904 through the USB cable connection 914. In this fashion, USB communication signals (e.g., data to be copied) originating at the USB host device 902 are transmitted to the USB peripheral device 904 through the Device and Host USB-X devices 906, 908 and the communication network 901.

Similarly, the Host Mode USB-X device 908 may receive USB communication signals from the USB peripheral device 904 and packetize (e.g., re-packetize) them for transmission over the communication network 901. The Host Mode USB-X device 908 may then generate network data packets each having control information (e.g., header and/or trailer) and a payload. The payload of each network data packet contains, at least in part, the USB communication signals, and the control information contains, at least in part, source and destination addresses. In this case, the control information, which may be a header, may contain a source address 922 associated with the Host Mode USB-X device 908 and a destination address 926 associated with the Device Mode USB-X device's network address 918. The source address 922 and the destination address 926 may be stored in a memory circuit 928 (e.g., flash memory) of the Host Mode USB-X 908. The destination address 926 is programmed to be that of the Device Mode USB-X device 906 because the USB host device 902 is coupled to and being served by the Device Mode USB-X device 906. The Host Mode USB-X device 908 may then transmit the network data packets, which include the USB communication signals, to the Device Mode USB-X device 906 through the communication network 901.

The Device Mode USB-X device 906 receives the network data packets transmitted by the Host Mode USB-X device 908. The Device Mode USB-X device 906 retrieves (e.g., de-packetizes) the USB communication signals stored in the payloads of the network data packets and then forwards the USB communication signals to the USB host device 902 through the USB cable connection 910. In this fashion, USB communication signals (e.g., data to be copied) originating at the USB peripheral device 904 are transmitted to the USB host device 902 through the Device and Host USB-X devices 906, 908 and the communication network 901.

Figure 10:
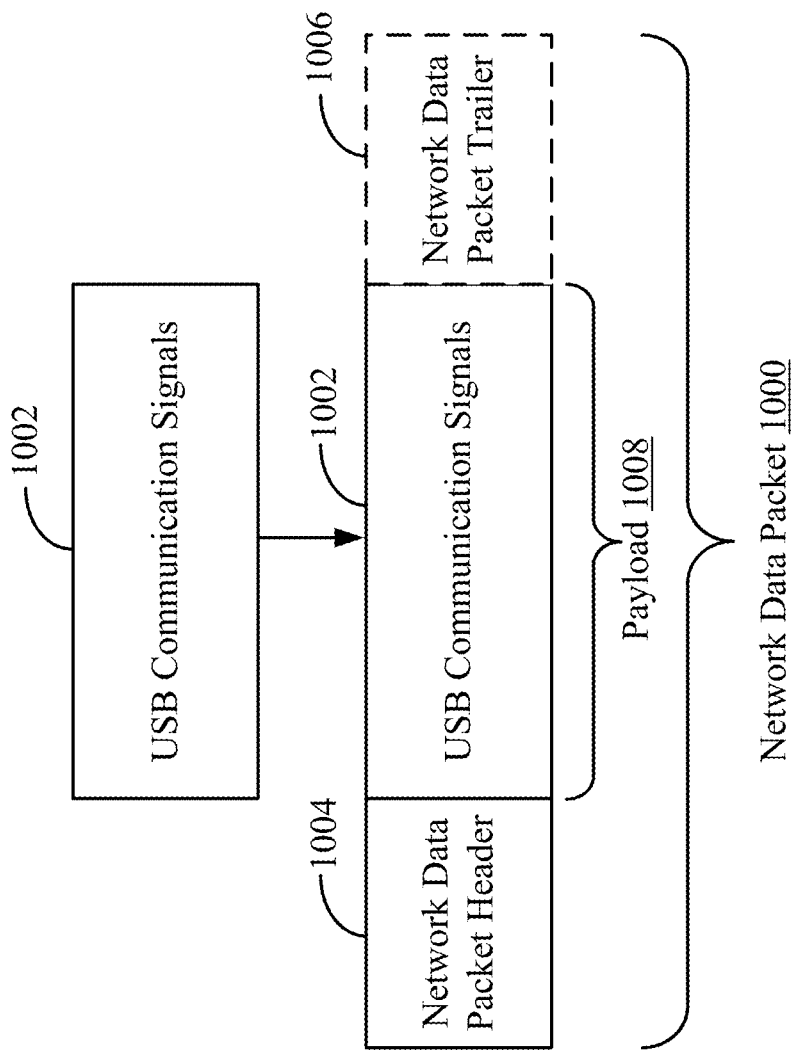
FIG. 10 illustrates a second exemplary conceptual diagram of how USB communication signals may be encapsulated as network data packets for transmission over a communication network.

FIG. 10 illustrates a conceptual diagram of how USB communication signals 1002 may be encapsulated as network data packets 1000 for transmission over the communication network 901. Referring to FIGS. 9 and 10, such USB communication signals 1002 may be transmitted and received over the communication network 901 between a USB host device and a USB peripheral non-HID. In order for the USB communication signals 1002 to be transmitted over the communication network it is encapsulated within network data packets (NDPs) 1000. The NDPs 1000 include control information (e.g., header 1004 and optionally trailer 1006) and payload 1008. The payload 1008 of the NDPs 1000 include the USB communication signals 1002. The header 1004 and/or trailer 1006 includes source and destination addresses. Among other information, they may also include error detection codes and/or sequencing information. The header 1004 shown in FIG. 10 may comprise multiple headers associated with different layers of the protocol stack (e.g., see FIG. 3) used by the communication network 901. Similarly, the trailer 1006 may comprise one or more trailers associated with different layers of the protocol stack used by the communication network 901.

Figure 11:
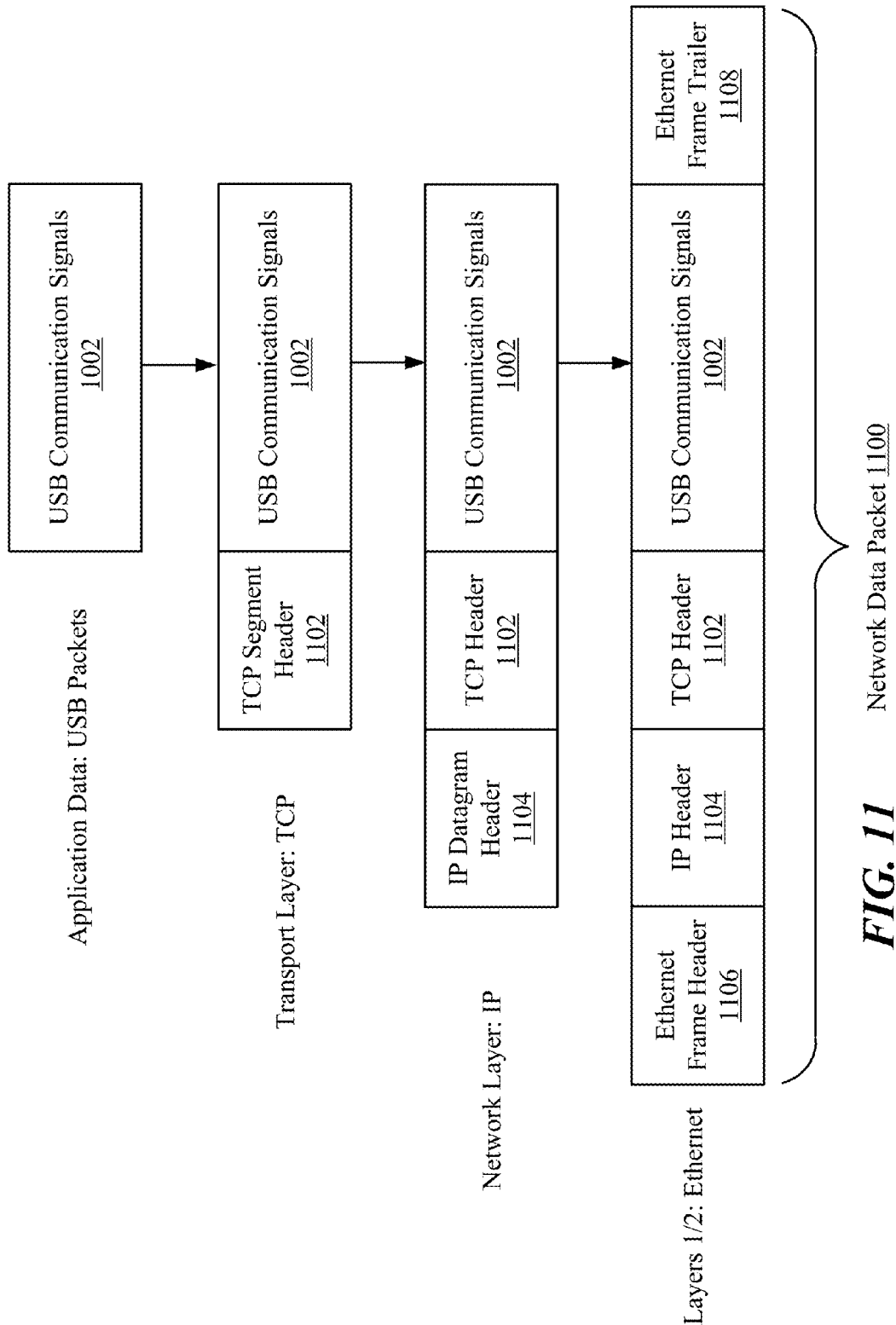
FIG. 11 illustrates a second exemplary conceptual diagram of the structure of a network data packet that includes USB communication signals as part of its payload.

FIG. 11 illustrates an exemplary conceptual diagram of the structure of a network data packet 1100 that includes USB communication signals 1002 as part of its payload according to one aspect of the disclosure. In this example, the network data packets 1100 are generated according to TCP/IP communication protocols. As such, the USB communication signals 1002 may be considered the application layer data that is to be transmitted from a source USB device to a destination USB device (e.g., from the USB peripheral device 904 to the USB host device 902) over the communication network 901.

The USB communication signals 1002 may first be preceded by a TCP header 1102 as part of the Transport Layer to form a segment. Next, the resulting segment may be preceded by an Internet Protocol (IP) header 1104 (e.g., IPv4 or IPv6) as part of the Network Layer to form a datagram. For example, the IP header 1104 may include the source IP address of the Host Mode USB-X device 908 coupled to the USB peripheral device 904 that may acting as the source of the USB communications signals. The IP header 1104 may also include the destination IP address of the Device Mode USB-X device 906 coupled to the USB host device 902 that is the destination of the USB communication signals 1002. The resulting IP datagram may then be encapsulated by an Ethernet frame header 1106 and trailer 1108 to form the network data packet 1100 ready for transmission over the communication network 901. In the example shown in FIG. 11, the Ethernet frame header 1106, the IP datagram header 1104, and the TCP segment header 1102 may together be considered the network data packet header (e.g., network data packet header 1004 of FIG. 10) and the Ethernet frame trailer 1108 may be considered the network data packet trailer (e.g., network data packet trailer 1006 of FIG. 10).

Figure 12:
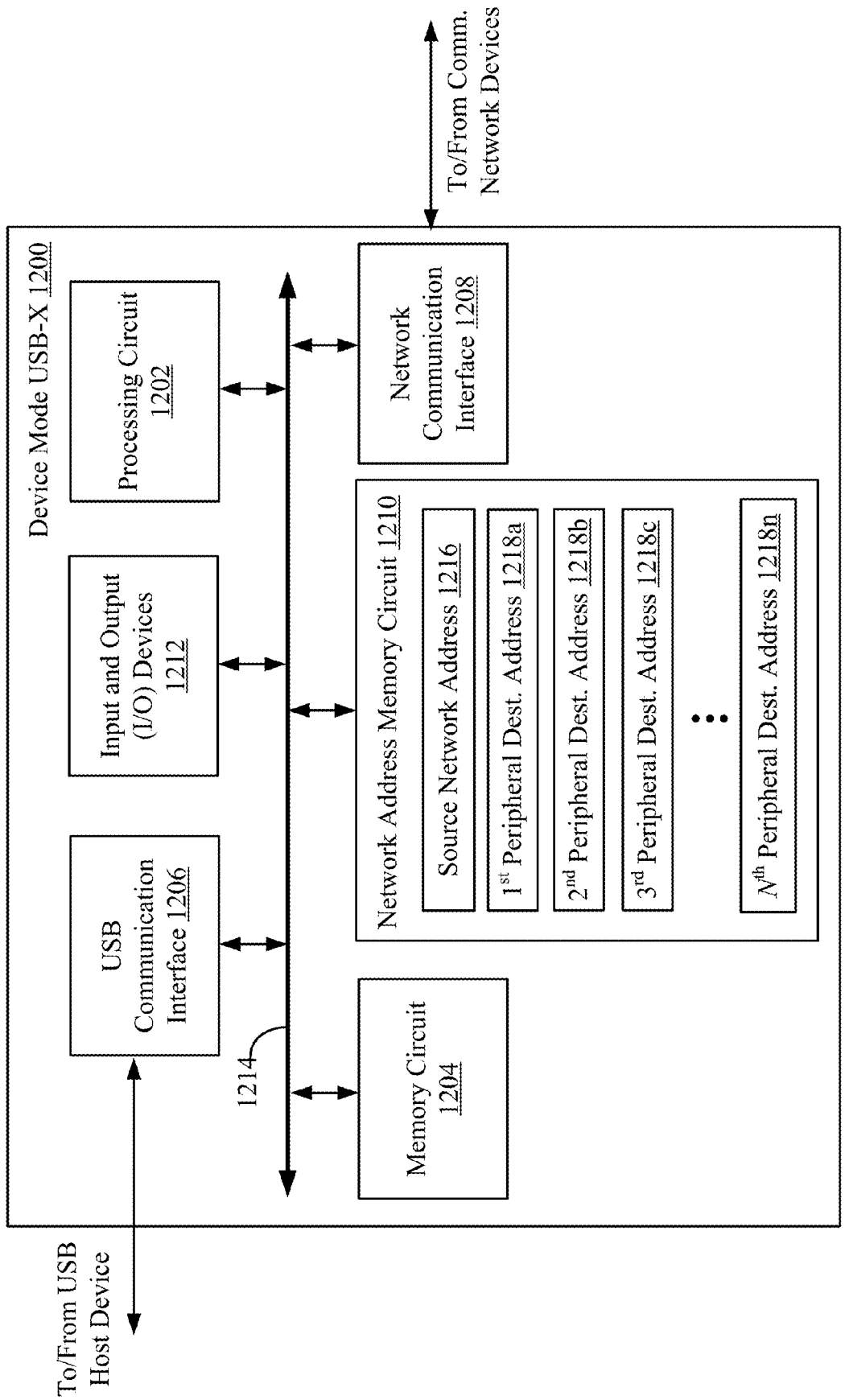
FIG. 12 illustrates a schematic block diagram of a Device Mode USB extender device that may be used to help transmit and receive USB communication signals between USB host devices and USB peripheral non-human interface devices (HID).

FIG. 12 illustrates a schematic block diagram of a Device Mode USB-X device 1200 that may be used to help transmit and receive USB communication signals between USB host devices and USB peripheral non-HIDs according to one aspect of the disclosure. The Device Mode USB-X device 1200 shown in FIG. 12 may represent any one of the Device Mode USB-X device 1200 devices described herein including the Device Mode USB-X devices 906, 1304a, 1304b . . . 1304n shown in FIGS. 9 and 13.

Referring to FIG. 12, the Device Mode USB-X 1200 may include at least one processing circuit 1202 (e.g., processor(s), application specific integrated circuit(s) (ASICs), field programmable gate array(s) (FPGAs)), at least one memory circuit 1204, a USB communication interface 1206 (e.g., first communication interface), a network communication interface 1208 (e.g., second communication interface), a network address memory circuit 1210, and input and output (I/O) devices 1212. According to one non-limiting, non-exclusive example, the processing circuit 1202, the memory circuit 1204, the USB communication interface 1206, the network communication interface 1208, the network address memory circuit 1210, and/or the I/O devices 1212 may be communicatively coupled together through a communication bus 1214. In other examples, the Device Mode USB-X 1200 components 1202, 1204, 1206, 1208, 710, 1212 may be communicatively coupled to each other through direct and/or indirect signal lines running between them.

The processing circuit 1202 may generally execute software instructions stored on the memory circuit 1204 and execute many of the processes and calculations performed at the Device Mode USB-X 1200. Among other things, the processing circuit 1202 may also generate network data packets containing USB data, retrieve USB data stored within network data packets, generate USB communication signals, compress USB data before embedding the compressed USB data as payload within network data packets, and/or decompress USB data and reconstruct USB communication signals.

The memory circuit 1204 may include volatile (e.g., SRAM, DRAM, SDRAM, etc.) and/or non-volatile memory (e.g., flash memory, read only memory, MRAM, etc.). The memory circuit 1204 may store, among other things, software instructions to be executed by the processing circuit 1202.

The USB communication interface 1206 transmits and receives USB communication signals (e.g., USB packets) to and from a USB host device over a USB cable connection. The USB communication interface 1206 includes all the hardware and/or software necessary to generate the USB communication signals on a physical layer level. The network communication interface 1208 transmits and receives network data packets to and from communication network devices (e.g., Host Mode USB-X devices, switches, servers, etc.) over a communication network.

The network address memory circuit 1210 may include non-volatile and volatile memory circuits. The network address memory circuit 1210 stores the network addresses (e.g., IP addresses) of itself and various other networked components associated with a communication network. For example, the network address memory circuit 1210 may store its own network address 1216 (e.g., source address). The memory circuit 1210 may also store a plurality of network destination addresses 1218a-1218n of Host Mode USB-X devices that are coupled to USB peripheral devices. The particular network destination addresses 1218a-1218n stored are associated with the USB peripheral devices a Host Mode USB-X device is coupled to that intend to receive USB communication signals over the network from the USB host devices. For example, a first network destination address 1218a may be the network destination address of a Host Mode USB-X that is coupled to a USB peripheral device with which the USB host device coupled to the Device Mode USB-X device 1200 wants to send data to. Similarly, a second network destination address 1218b may be the network destination address of the same or another Host Mode USB-X that is coupled to another USB peripheral device with which the USB host device wants to send data to, and so on.

The I/O devices 1212 may include one or more buttons that program the source network address 1216, reset the Device Mode USB-X 1200, power ON/OFF the Device Mode USB-X 1200, and/or carry out a self-test that determines whether the Device Mode USB-X 1200 is operating correctly. The I/O devices 1212 may also include status light emitting diode (LED) indicators that light up and/or blink to indicate different statuses of the Device Mode USB-X 1200. Non-exhaustive examples of these statuses may indicate whether the Device Mode USB-X 1200 is powered ON/OFF, communicating with a USB host device, communicating with a network device, passed/failed a self-test, etc.

Figure 13:
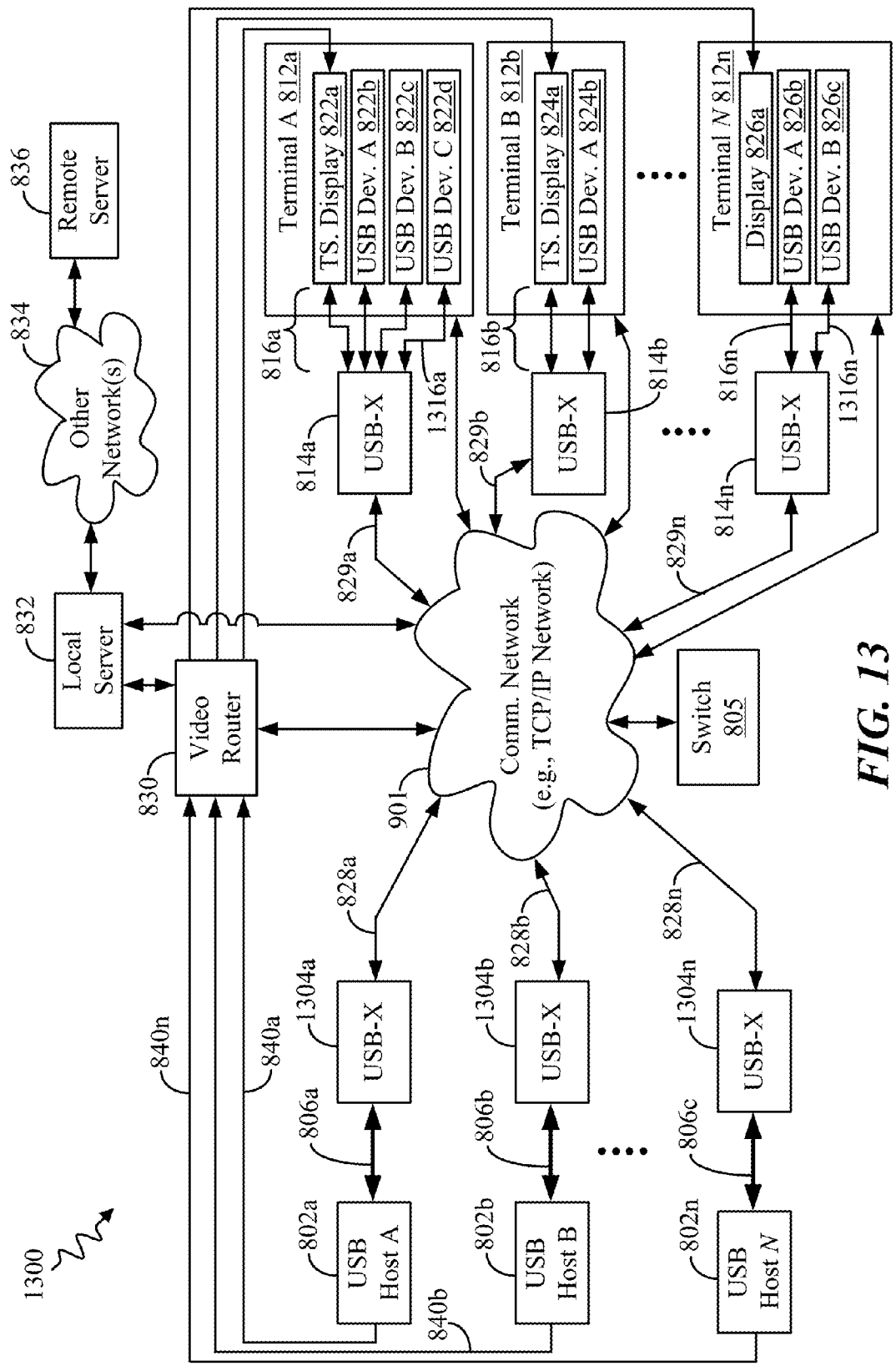
FIG. 13 illustrates a fourth exemplary schematic block diagram of a communication system for enabling long distance USB signal communication.

FIG. 13 illustrates a schematic block diagram of a communication system 1300 for enabling long distance USB signal communication according to one aspect of the disclosure. The system 1300 shown in FIG. 13 is the same as the system 800 shown in FIG. 8 except that: the communication network 901 may be a TCP/IP network instead of the UDP/IP network; the USB peripheral device D 822*d*, which may be, for example, a storage device (e.g., SSD), located at terminal A 812*a* is coupled to the Host Mode USB-X device 814*a* through a standard USB cable 1216*a*; the USB peripheral device B 826*c*, which may be, for example, a CD/DVD drive, located at terminal N 812*n* is coupled to the Host Mode USB-X device 814*n* through a standard USB cable 1216*n*; and the Device Mode USB-X devices 1304*a*, 1304*b* . . . 1304*n* are identical to the Device Mode USB-X device 1200 shown in FIG. 12.

The non-HID USB peripheral devices 822*d*, 826*c* coupled to terminals A and N 812*a*, 812*n* may transmit and receive USB communication signals with any one of the USB host devices 802*a*, 802*b* . . . 802*n* according to the processes described above with respect to FIGS. 9, 10, 11, and/or 12. Similarly, the USB host devices 802*a*, 802*b* . . . 802*n* may transmit and receive USB communication signals with any one of the USB peripheral devices 822*d*, 826*c* according to the processes described above with respect to FIGS. 9, 10, 11, and/or 12.

Compression and Decompression Algorithms

As described above with respect to FIGS. 2 and 8, the Host Device USB-X devices 208, 814*a*, 814*b* . . . 814*n* may execute compression algorithms after receiving USB communication signals from the one or more USB peripheral HIDs 204, 822*a*, 822*b*, 822*c*, 824*a*, 824*b*, 826*b* that may be coupled to it. This may be performed in order to minimize the number of and frequency of network data packets transmitted through the communication network 201 to the corresponding Device Mode USB-X device 206, 804*a*, 804*b* . . . 804*n*.

Figure 14:
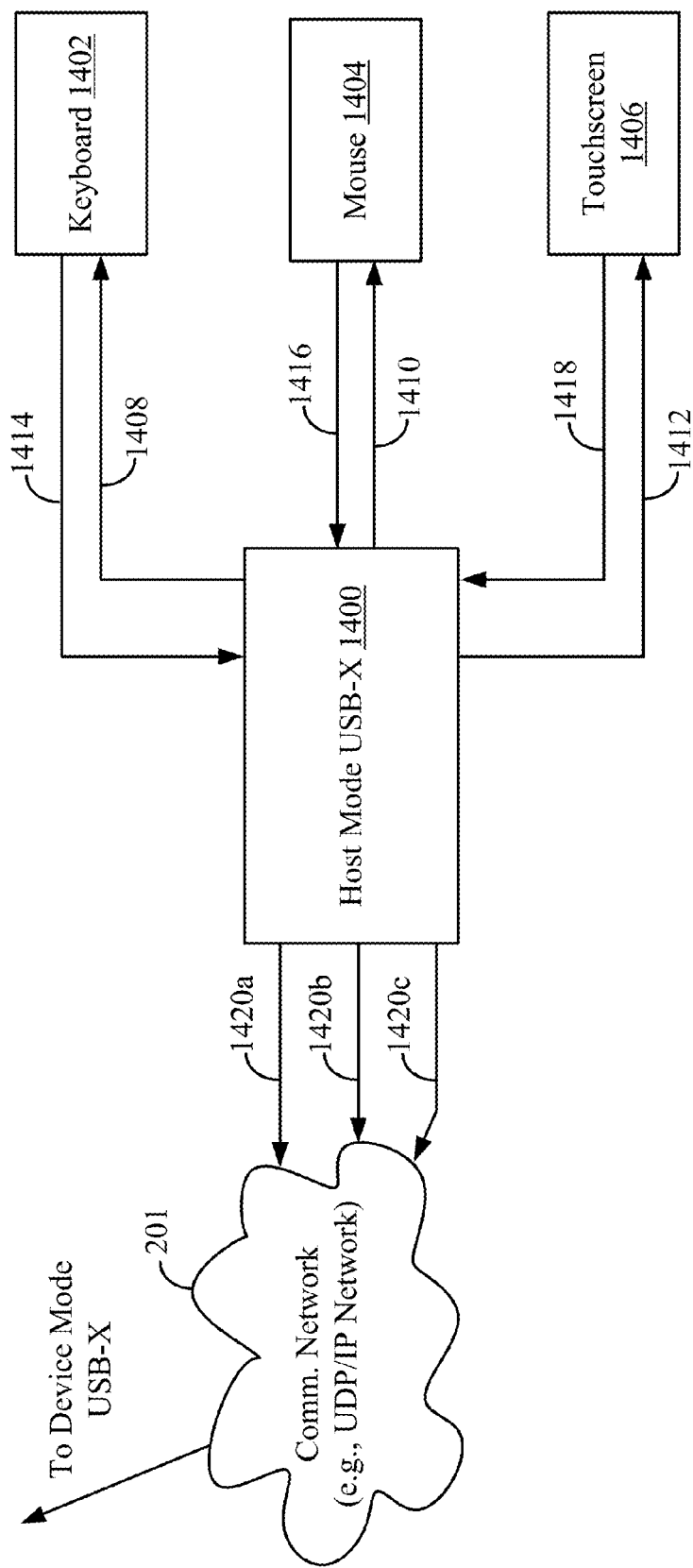
FIG. 14 illustrates a schematic block diagram of a Host Mode USB extender device coupled to a plurality of USB peripheral HIDs and a communication network.

FIG. 14 illustrates a schematic block diagram of a Host Mode USB-X device 1400 coupled to a plurality of USB peripheral HIDs 1402, 1404, 1406 and a communication network 201. In the illustrated example, the Host Mode USB-X device 1400 is coupled to a USB keyboard 1402, a USB mouse 1404, and a USB touchscreen display 1406 through standard USB cables. The USB-X device 1400 is also communicatively coupled to the communication network 201, which may be any packet switching network such as, but not limited to, a network that utilizes a UDP/IP protocol stack.

The Host Mode USB-X device 1400 transmits USB messages, such as polling messages 1408, 1410, 1412, to the HIDs 1402, 1404, 1406 at predetermined time intervals, such as once every 1 millisecond (ms) to 5 ms. The HIDs transmit back USB data responses 1414, 1416, 1418 to the polling messages 1408, 1410, 1412. The USB-X device 1400 processes the responses 1414, 1416, 1418 according to one or more compression algorithms before transmitting out network data packets 1420*a*, 1420*b*, 1420*c* that may include USB data received from the HIDs 1402, 1404, 1406. According to one aspect, if the USB-X device 1400 receives responses 1414, 1416, 1418 that include substantive USB data indicative of an actual user input (e.g., mouse click, mouse movement, mouse-wheel movement, touchscreen press, touchscreen de-press, touchscreen movement, keyboard stroke, etc.) then such "data-present responses" will included as payload within network data packets generated at and transmitted by the Host Mode USB-X device 1400. Alternatively, if the responses 1414, 1416, 1418 do not include such data-present responses and instead are indicative of no new user input data received (e.g., no keyboard strokes received, no mouse clicks received, no mouse movement, no mouse-wheel movement, no touchscreen press or de-press, or touchscreen movement, etc.), then such "no-data responses" may be ignored by the Host Mode USB-X 1400 and not transmitted as network data packets over the network in order to preserve communication network 201 bandwidth.

For example, the Host Mode USB-X device 1400 may transmit polling messages 1408 to the keyboard 1402 every 1 ms to 5 ms. The keyboard 1402 may respond back with a message 1414 that includes keyboard stroke data received from a user operating the keyboard 1402 (i.e., data-present response) or indicates that no keyboard stroke data was received (i.e., "no-data response"). In the former case where the USB-X 1400 receives keyboard stroke data, the USB-X 1400 generates network data packets that include the keyboard stroke data and transmits these packets 1420*a* to a Device Mode USB-X through the communication network 201. In the latter case where the USB-X 1400 receives a no-data response, the USB-X 1400 may choose to ignore the response received from the keyboard 1402 by not generating and transmitting any network data packets that include the no-data response. In this fashion, communication network 201 bandwidth is saved by not transmitting no-data responses to a Device Mode USB-X.

Figure 15:
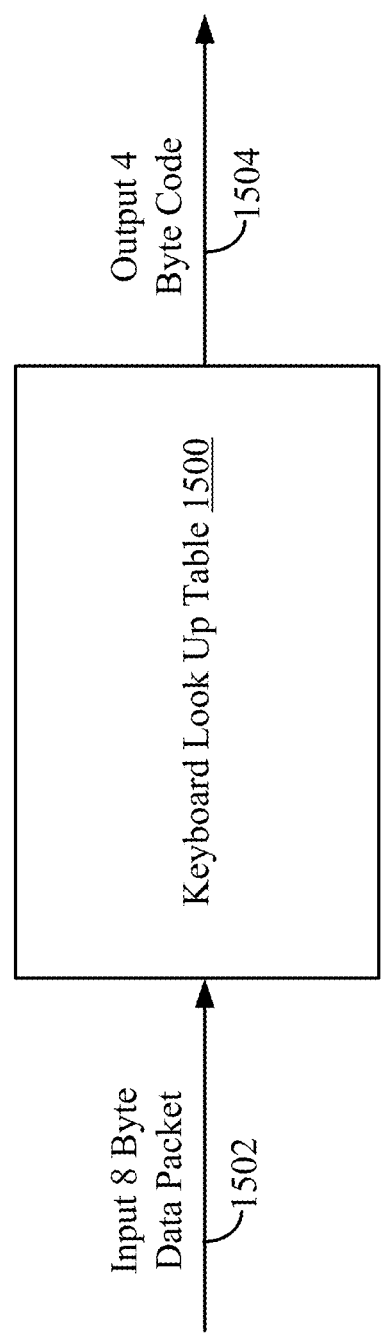
FIG. 15 illustrates a look up table.

In one aspect of the disclosure, the Host Mode USB-X 1400 may compress the keyboard stroke data 1414 received from the keyboard 1402. The incoming keyboard stroke data 1414 from the USB keyboard 1402 may include 8 byte length data packets that each represent one keyboard keystroke state. For example, pressing the "h" key is one such state and is represented by an 8 byte data packet. As another example, pressing "t", "d", and "p" simultaneously is another such state and is represented another 8 byte data packet. The USB-X 1400 may reduce the packet length down from 8 bytes to 4 bytes using a look up table (LUT) to do the conversion, thereby compressing the keyboard stoke data 1414. The LUT may be stored within a memory circuit (e.g., memory circuit 704 shown in FIG. 7) of the USB-X 1400. First, the LUT is constructed to remove impossible key states: duplicated keys in a state such as pressing "a" twice simultaneously; states having more than four key modifier (i.e., "Alt", "Ctrl", "Shift", etc.) pressed simultaneously). Second, one byte of the 8 byte data packet, which is constant/redundant is omitted. Thus, referring to FIG. 15 (which illustrates a look up table), an 8 byte input key stroke state 1502 is fed into the LUT 1500 and an output code 1504 is generated. A network data packet is then generated by the USB-X 1400 that includes the output code 1504 as its payload. Once it's transmitted to the Device Mode USB-X, the Device Mode USB-X decodes the code 1504 received and using a corresponding LUT it generates the original 8 byte key stroke state 1502, which it then may transmit to a USB host device coupled to it.

Referring to FIG. 14, as another example, the Host Mode USB-X device 1400 may transmit polling messages 1410 to the mouse 1404 every 1 ms to 5 ms. The mouse 1404 may respond back with a message 1416 that includes USB mouse data (e.g., button-click data and/or mouse movement data)

from a user operating the mouse 1404 (i.e., data-present response) or alternatively a message that indicates that no new mouse data was received (i.e., no-data response). In the former case where the USB-X 1400 receives button-click and/or movement data, the USB-X 1400 generates network data packets that include this data and transmits these packets 1420b to a Device Mode USB-X through the communication network 201. In the latter case where the USB-X 1400 receives a no-data response, the USB-X 1400 may choose to ignore the response received from the mouse 1404 by not generating and transmitting any network data packets that include the no-data response. In this fashion, communication network 201 bandwidth is saved by not transmitting no-data responses to a Device Mode USB-X.

In one aspect of the disclosure, the Host Mode USB-X 1400 may temporally compress the USB mouse data (e.g., button-click data and/or mouse movement data) received from the mouse 1404 before generating and transmitting network data packets. For example, rather than generating and transmitting out network data packets that include mouse movement data as it is received from the mouse 1404, the USB-X 1400 may accumulate the mouse movement data (e.g., x-y coordinates and mouse wheel values) for a predefined period of time (e.g., 10 ms-50 ms) before generating and transmitting it out over the network 201 where the predefined period of time is greater than the polling period (i.e., time period between successive polling messages sent by the USB-X 1400 to the USB mouse 1404). The predefined period of time may be two times, 3 times, 5 times, 10 times greater or more than the polling period.

Figure 16:
FIG. 16 illustrates an exemplary table that shows how relative x-y coordinates and mouse wheel values may be received and accumulated at a USB extender device before they are sent out as payload of network data packets.

FIG. 16 illustrates an exemplary table 1600 that shows how relative x-y coordinates and mouse wheel values may be received and accumulated at the USB-X 1400 (see FIG. 14) before they are sent out as the payload of network data packets 1420b by the USB-X 1400. Referring to FIGS. 14 and 16, in the illustrated example the USB-X 1400 may receive the relative x-y coordinates and mouse wheel values every 1 ms and be programmed to accumulate this data for 50 ms before generating and transmitting network data packets out over the communication network 201 containing the accumulated data. For simplicity, the table 1600 shown in FIG. 16 shows the relative x-y coordinates and mouse wheel values received at 10 ms, 20 ms, 30 ms, 40 ms, 50 ms, and 60 ms instead of every 1 ms. The relative x-y coordinates and mouse wheel values are accumulated and then at the 50 ms mark the accumulated values (bolded and underlined) are transmitted out as network data packets 1420b to a Device Mode USB-X through the communication network 201. In this fashion, the relative x-y coordinates and mouse wheel values are temporally compressed and the communication network 201 is not burdened with having to transmit the relative x-y coordinates and mouse wheel values every 1 ms as it is received from the USB mouse 1404. Thus, the USB-X 1400 transmits out the data at a slower rate than it receives it.

In addition to transmitting out the mouse movement data at predefined time periods, the USB-X device 1400 may also detect while accumulating if one of the values (e.g., x-coordinate value, y-coordinate value, and/or wheel value) of the mouse movement data has reached its maximum or minimum data value (e.g., ±255). In such a case, the USB-X 1400 may transmit out the mouse movement data immediately rather than waiting for the expiration of the predefined period of time. As an example, referring to FIG. 16, if the accumulated x-coordinate value at time 30 ms had reached +255 (specific maximum value is merely exemplary), the USB-X 1400 would then immediately transmit out all of the mouse movement values (e.g., x-coordinate value, y-coordinate value, and wheel value) after packetizing them through the network 201.

The example shown in FIG. 16 is merely exemplary. In other examples, the relative x-y coordinates and mouse wheel values may be accumulated for other periods of time (e.g., 10 ms-100 ms) before being transmitted out through the network. In some aspects, the relative x-y coordinates and mouse wheel values are not accumulated and the USB-X 1400 generates and transmits network data packets including the relative x-y coordinates and mouse wheel values as payload as it is received (i.e., at the original rate received).

According to one aspect, mouse button-click data indicative of buttons on the mouse be pressed by a user are transmitted out by the USB-X 1400 as they are received from the mouse 1404. Thus, if the USB-X 1400 receives a message 1414 indicating that, for example, the left mouse button was pressed then the USB-X 1400 generates a network data packet 1420b that includes as payload the left-mouse button click data and transmits it out over the communication network 201.

Referring to FIG. 14, as another example, the Host Mode USB-X device 1400 may transmit polling messages 1412 to the touchscreen 1406 every 1 ms to 5 ms. The touchscreen 1406 may respond back with a message 1418 that includes touchscreen data (e.g., the touchscreen was pressed/depressed and movement data) from a user operating the touchscreen 1406 (i.e., data-present response) or alternatively a message that indicates that no new touchscreen data was received (i.e., no-data response). In the former case where the USB-X 1400 receives touchscreen was pressed/depressed and movement data, the USB-X 1400 generates network data packets that include this data and transmits these packets 1420c to a Device Mode USB-X through the communication network 201. In the latter case where the USB-X 1400 receives a no-data response, the USB-X 1400 may choose to ignore the response received from the touchscreen 1406 by not generating and transmitting any network data packets that include the no-data response. In this fashion, communication network 201 bandwidth is saved by not transmitting no-data responses to a Device Mode USB-X.

Similar to the process described above for USB mouse data received from the mouse 1404, the Host Mode USB-X 1400 may accumulate x-y coordinate data (e.g., finger movement on the touchscreen) for a certain period of time before generating and transmitting network data packets 1420c containing such information over the communication network 201. This may be done instead of transmitting out such information as it is received every 1 ms-5 ms to preserve communication network 201 bandwidth. Similar to the mouse button-click data, the Host Mode USB-X 1400 may also generate and transmit out network data packets that include touchscreen pressed/depressed data as soon as it is received.

Figure 17:
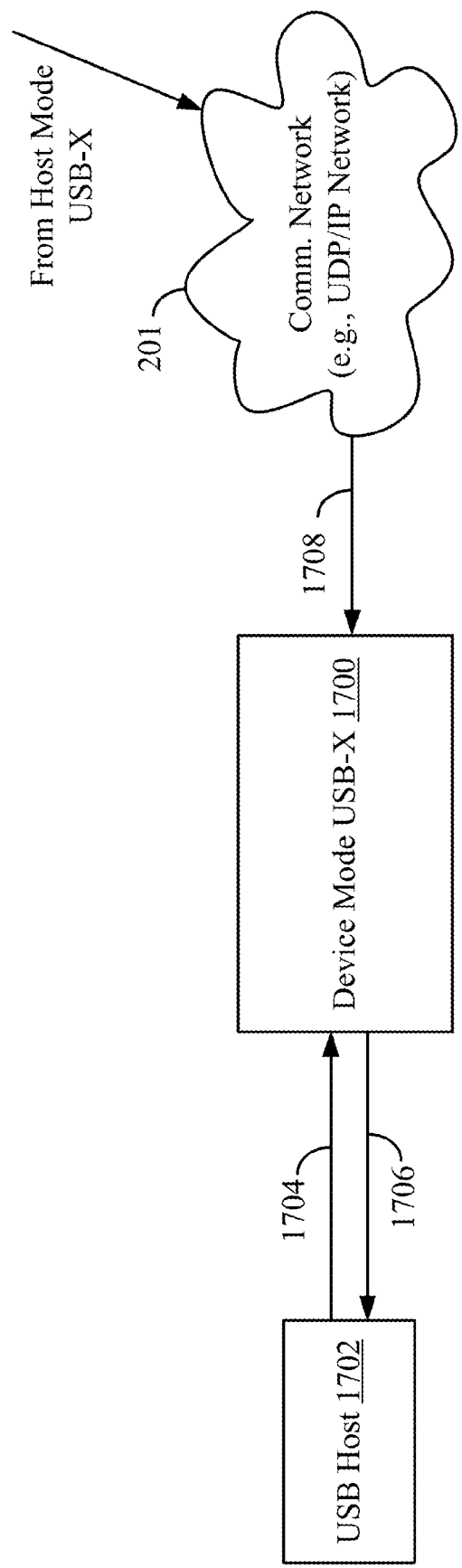
FIG. 17 illustrates a schematic block diagram of a Device Mode USB extender device coupled to a USB host device and a communication network.

FIG. 17 illustrates a schematic block diagram of a Device Mode USB-X device 1700 coupled to a USB host device 1702 and a communication network 201. In the illustrated example, the Device Mode USB-X device 1700 is coupled to a USB host device 1702 (e.g., server) through a USB cable, and also communicatively coupled to the communication network 201, which may be any packet switching network such as, but not limited to, a network that utilizes a UDP/IP protocol stack.

The Device Mode USB-X device 1700 receives polling messages 1704 from the USB host device 1702 at predetermined time intervals such as once every 1 ms. The USB-X device 1700 transmits back USB data packets 1706 to the polling messages 1704 that are based on data received within network data packets 1708 received from a Host Mode USB-X device over the communication network 201. The Device Mode USB-X device 1700 processes the network data packets 1708 received according to one or more decompression algorithms before generating and transmitting the USB data packets 1706 to the USB host device 1702.

According to one aspect, the Device Mode USB-X 1700 may identify the type of peripheral HID (e.g., keyboard, mouse, touchscreen, etc.) that incoming network data packets 1708 are associated with based on identifiers within the packets 1708 (e.g., source address of peripheral device). Using this information the Device Mode USB-X 1700 may reconstruct USB communication signals associated with the type of peripheral HID identified when transmitting the USB communication signals to the USB host device 1702.

The USB-X 1700 may also identify whether the network data packets 1708 include compressed or non-compressed USB data. For example, it may determine that the incoming network data packets 1708 include mouse movement data (e.g., relative x-y coordinates and mouse wheel values) that are temporally compressed by a Host Mode USB-X device (e.g., USB-X device 1400 in FIG. 14) according to a predefined periodic time rate (e.g., every 10 ms, 20 ms, 30 ms, 40 ms, 50 ms, etc. as described above), and generate and transmit USB communication signals that include the mouse movement data to the USB host device 1702 according to the predefined periodic time rate. As another example, it may determine that the incoming USB data is keyboard stroke data that has been compressed according to an LUT (see, for example, FIG. 15). Identifiers within the network data packets set by the Host Mode USB-X when generating the network data packets may be used by the Device Mode USB-X 1700 to make these determinations.

The Device Mode USB-X 1700 may then de-packetize the received network data packets 1708 and decompress the USB data payload within assuming it is in a compressed form. This may include using a corresponding reverse LUT stored at the Device Mode USB-X 1700 to retrieve the original 8 byte keyboard stroke state if the received USB data was compressed keyboard stroke data.

The Device Mode USB-X 1700 may also reconstruct USB communication signals out of the USB data within the network data packets 1708 received. In the case of USB mouse relative x-y coordinates and mouse wheel values, the USB communication signals generated that includes this data may be transmitted to the USB host device 1702 at the same rate it was received by the Device Mode USB-X 1700. The same may be true of touchscreen data received at the Device Mode USB-X 1700.

Exemplary Graphical User Interface

Figure 18:
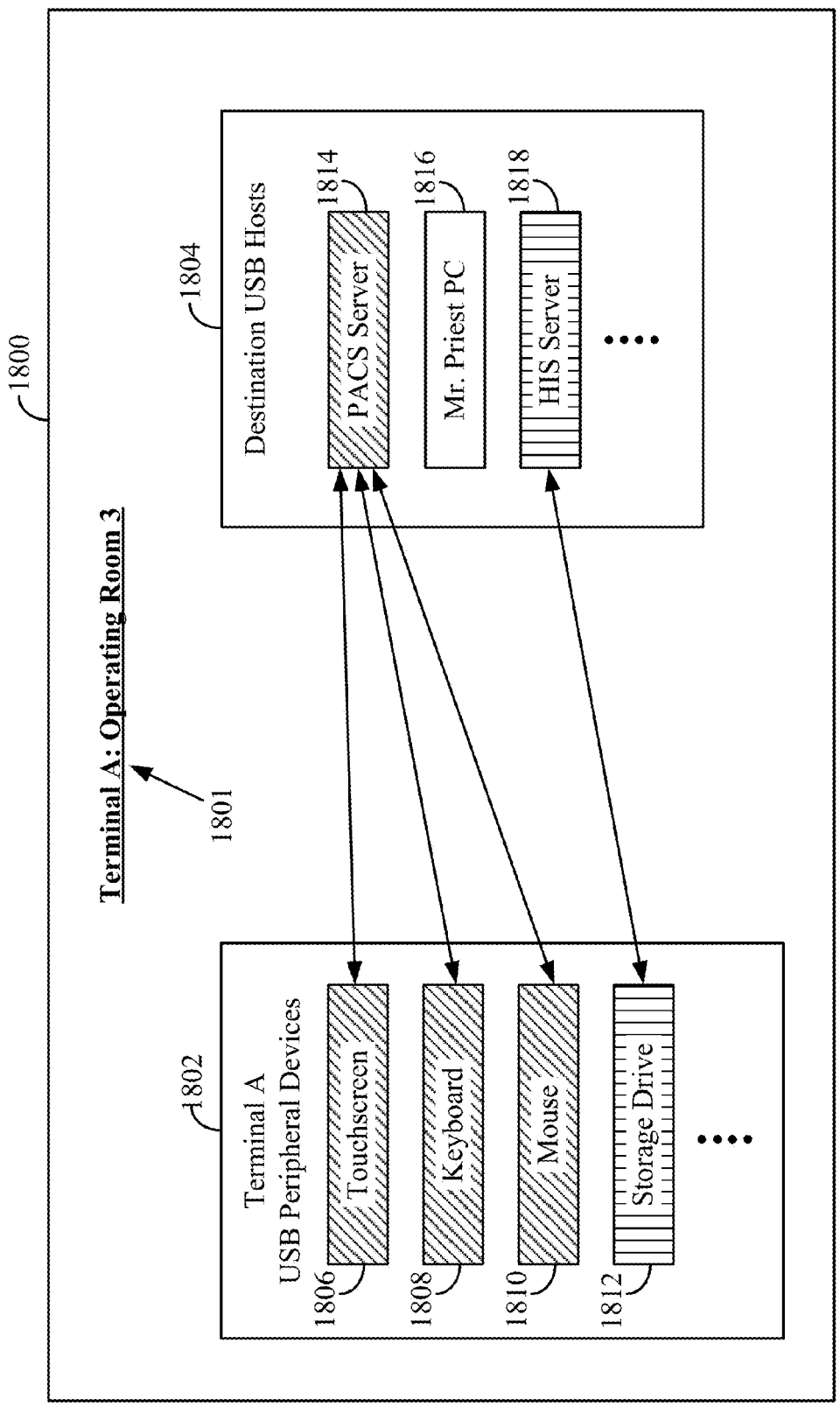
FIG. 18 illustrates an exemplary GUI of a software application.

FIG. 18 illustrates an exemplary GUI 1800 of a software application according to one aspect of the disclosure. Referring to FIGS. 8, 13, and 18, the GUI 1800 may be observed and utilized by a user located at one ore more terminals 812a, 812b . . . 812n. In some aspects, the GUI 1800 may be accessed by a user from a host device 802a, 802b . . . 802n, 1304a, 1304b . . . 1304n as well. The software application associated with the GUI 1800 may be resident to and executed at the local server 832 ("server"). As described in greater detail below, the GUI 1800 allows a user to choose how USB data and USB communication signals are routed between the USB host devices 802a, 802b . . . 802n, 1304a, 1304b . . . 1304n and the USB peripheral devices 822a-822d, 824a, 824b, 826b, 826c.

The GUI 1800 may include a location identifier 1801 that identifies the location of where the GUI 1800 is being operated. In the example shown, the GUI 1800 is being operated at terminal A 812a, which may be located within a medical operating room. The GUI 1800 may further include a list 1802 containing buttons for USB peripheral devices that are coupled to and/or associated with terminal A 812a. In the illustrated example, the list 1802 includes buttons 1806, 1808, 1810, 1812 for a touchscreen display, a keyboard, a mouse, and a storage device. The touchscreen display button 1806 may be associated with the touchscreen display 822a, the keyboard button 1808 may be associated with USB device A 822b (e.g., a keyboard), the mouse button 1810 may be associated with USB device B 822c (e.g., a mouse), and the storage device button 1812 may be associated with USB device C 822d (e.g., a solid state drive or a hard drive). Instead of buttons containing text describing the peripheral device connected as shown, graphical icons may be used instead or in addition to such buttons having text.

The GUI 1800 may further include another list 1804 containing buttons for destination USB hosts (i.e., USB host devices) that terminal A 812a is authorized to access and may access using one or more of the peripheral devices 1806, 1808, 1810, 1812 at terminal A 812a. In the illustrated example, the list 1804 includes buttons 1814, 1816, 1818 for a plurality of destination USB hosts including a PACS server, a personal computer (e.g., Mr. Priest's PC), and a hospital information systems (HIS) server. The PACS server button 1814 may be associated with USB host device A 802a (e.g., a PACS server), the personal computer button 1816 may be associated with USB host device B 802b (e.g., Mr. Priest's PC), and the HIS server button 1818 may be associated with USB host device N 802n (e.g., HIS server).

The various USB peripheral device buttons 1806, 1808, 1810, 1812 and the destination USB host buttons 1814, 1816, 1818 control the flow of USB communication signals and USB data between the USB peripheral devices 822a-822d coupled to terminal A 812a and the USB host devices 802a, 802b . . . 802n, 1304a, 1304b . . . 1304n. For example, a user operating the GUI 1800 may select one or more USB peripheral device buttons 1806, 1808, 1810, 1812 and also select one or more destination USB host buttons 1814, 1816, 1818. Doing so may cause one or more USB-X devices 804a, 804b . . . 804n, 1304a, 1304b . . . 1304n, 814a, to which the USB hosts 802a, 802b . . . 802n and the USB peripheral devices 822a-822d are connected with, to be configured (e.g., programmed) with network destination addresses that will facilitate proper routing of USB communication signals and USB data between the USB peripheral devices 822a-822d and the USB host devices 802a, 802b . . . 802n, 1304a, 1304b . . . 1304n. Examples of this are provided below.

Referring to the example illustrated in FIGS. 6, 7, 8, and 18, a user has selected the touchscreen display button 1806, the keyboard button 1808, the mouse button 1810, and the PACS server button 1814 to match up with one another (e.g., each button may attain the same color as indicated by the same style line hashing shown). Consequently, the user has assigned the touchscreen display 822a, the keyboard 822b, and the mouse 822c to control the PACS server 802a. This selection causes the Host Mode USB-X device's 814a peripheral destination addresses 718a . . . 718n to be programmed with the network address 616 of the Device Mode USB-X device 804a to which the PACS server 802a is coupled. The programming may be in part performed by the local server 832 (e.g., control module/circuit 838), which provides the network address 616 information of the Device Mode USB-X 804a to the Host Mode USB-X device 814a through the communication network 201. The local server 832 (e.g., control module/circuit 838) may transmit a command to the Host Mode USB-X device 814a instructing it to write the network address 616 information provided to it at the appropriate peripheral destination addresses 718a . . . 718n. Once the Host Mode USB-X device 814a has stored the correct network address 616 in its peripheral destination address modules 718a . . . 718n, the Host Mode USB-X device 814a and the Device Mode USB-X device 804a process, transmit, and provide the USB data received from the touchscreen 822a, the keyboard 822b, and the mouse 822c to the PACS server 802a according to the steps, procedures, and components described above with respect to FIGS. 2, 3, 4, 5, 6, 7, and 8. The example provided above with respect to USB data exchange between the touchscreen 822a, the keyboard 822b, the mouse 822c, and the PACS server 802a is not limiting. The same process can be used for USB data exchange between any USB host device 802a, 802b . . . 802n and USB peripheral HID 822a-822c, 824a, 824b, 826b.

As another example, referring to FIGS. 7, 12, 13, and 18, a user has selected the storage device button 1812 and the HIS server button 1818 to match up with one another (e.g., each button may attain the same color as indicated by the same style line hashing shown). Consequently, the user has assigned the storage device 822d and the HIS server 802n to be able to read and/or write data to and from one another. This selection causes one of the Host Mode USB-X device's 814a peripheral destination addresses 718a . . . 718n (e.g., peripheral destination address 718n) to be programmed with the network address 1216 of the Device Mode USB-X device 1304b coupled to the HIS server 802b. Similarly, the selection also causes one of the Device Mode USB-X device's 1304b peripheral destination addresses 1218a . . . 1218n (e.g., peripheral destination address 1218n) to be programmed with the network address 716 of the Host Mode USB-X device 814a coupled to storage device 822d. The programming may be in part performed by the local server 832 (e.g., control module/circuit 838), which provides the network address 1216 information of the Device Mode USB-X 1304b to the Host Mode USB-X device 814a through the communication network 901, and also provides the network address 716 information of the Host Mode USB-X 814a to the Device Mode USB-X 1304b through the communication network 901. The local server 832 (e.g., control module/circuit 838) may transmit commands to the Device Mode USB-X 1304b and the Host Mode USB-X device 814a instructing them to write the network addresses provided to the appropriate peripheral destination addresses 718a . . . 718n, 1218a . . . 1218n. Once the Device Mode USB-X 1304b and the Host Mode USB-X 814a have stored the correct network addresses their peripheral destination address modules 718a . . . 718n, 1218a . . . 1218n, the Host Mode USB-X device 814a and the Device Mode USB-X device 1304b transmit and receive the USB communication signals (e.g., data to be read and copied to and from the storage device 822d and the HIS server 802b) according to the steps, procedures, and components described above with respect to FIGS. 7, 9, 10, 11, 12, and/or 13. The example provided above with respect to USB communication signal exchange between the storage device 822d and the HIS server 802b is not limiting. The same process can be used for USB communication signal exchange between any USB host device 802a, 802b . . . 802n and USB peripheral non-HID (e.g., USB peripheral non-HID 826c).

Referring to FIGS. 8, 13, and 18, according to one aspect, the software application associated with the GUI 1800 may be an application stored and executed at memory and processing circuits of the terminals 812a, 812b . . . 812n. According to another aspect, the software application may be stored and executed at the local server 832 and/or remote server 836. Regardless of where the application is stored and executed, the GUI 1800 may be accessed at the terminals 812a, 812b . . . 812n through, for example, an internet browser. The example of the GUI 1800 shown in FIG. 18 is merely one example of a GUI that can be used to control the routing of USB data and USB communication signals between USB devices 802a, 802b . . . 802n, 822a-822d, 824a, 824b, 826b, 826c. Many other GUI configurations utilizing icons, tabs, etc. can be implemented to select which USB peripheral devices are to assigned to which USB host devices and vice versa.

According to one aspect of the disclosure, a user operator may select routing destinations for USB communication signals between USB peripheral devices 822a-822d, 824a, 824b, 826b, 826c and USB host devices 802a, 802b . . . 802n using "hot key" assignments on their keyboard. Such hot keys may be used in addition to or alternatively to the GUI 1800. For example, a combination of keys (e.g., ALT+F9) on a keyboard (e.g., keyboard 822b at terminal A 812a) may be a hot key associated with one of the USB host devices 802a, 802b . . . 802n such as the PACS server 802a. Selecting that particular hot key causes the Host Mode USB-X device's 814a peripheral destination address 718a . . . 718n to be programmed with the network address 616 of the Device Mode USB-X 804a coupled to the PACS server 802a. The Host Mode USB-X device 814a and the Device Mode USB-X device 804a may then process, transmit, and provide the USB data received from the touchscreen 822a, the keyboard 822b, and the mouse 822c to the PACS server 802a according to the steps, procedures, and components described above with respect to FIGS. 2, 3, 4, 5, 6, 7, and 8.

In one aspect of the disclosure, a user operator located at terminal A 812a is not limited to merely sending and receiving USB data to one USB host device 802a, 802b . . . 802n at a time. Instead, the user may send and receive USB data to a plurality of USB hosts 802a, 802b . . . 802n at substantially the same time. For example, referring to FIG. 8, the user may execute a hot key at terminal A 812a that causes the keyboard 822b and the mouse 822c at terminal A 812a to transmit USB data to the PACS server 802a over the communication network 201. In the event the PACS server 802a may not be able to utilize/interpret USB data associated with the touchscreen display 822a, the user operator may select (e.g., another hot key or via selecting a button on the GUI 1800) another USB host device (e.g., host device B 802b) for receiving such touchscreen display 822a USB data. In this fashion, the user may transmit USB data to two different hosts (e.g., hosts A 802a and host B 802b) at the same time. An example of such multi-host communication is also demonstrated in FIG. 18 where USB data from the touchscreen 822a, the keyboard 822b, and the mouse 822c are routed to the PACS server 802a and USB communication signals from the storage device 822d are routed to the HIS server 802n.

Video Signal Routing Based on how USB Data is Routed Between USB Peripheral Devices and USB Host Devices Referring to FIGS. 8 and 13, the systems 800, 1300 may also include a video router 830 and a local server 832 according to one aspect. The video router 830 receives video data from the one or more USB host devices 802a, 802b . . . 802n and routes the video data to the appropriate destination displays 822a, 824a, 826a. The local server 832 (e.g., control module/circuit 838) may send commands to the video router 830 controlling what video source signals 840a, 840b . . . 840n are transmitted/switched to which displays 822a, 824a, 826a. According to one example, the local server 832 (e.g., control module/circuit 838) may issue such commands based on information it receives from the USB-X devices 804a, 804b . . . 804n, 1304a, 1304b . . . 1304n, 814a, 814b . . . 814n as to where USB data and USB communication signals are being routed to and from between the USB host devices 802a, 802b . . . 802n and the USB peripheral devices 822a-822d, 824a, 824b, 826b, 826c. The local server 832 may include a list of all the network addresses assigned to the all of the networked components 804a, 804b . . . 804n, 1304a, 1304b . . . 1304n, 814a, 814b . . . 814n, 805, 812a, 812b . . . 812n, 830.

For example, in the aforementioned case where a user operator at terminal A 812a desires to access information located at a PACS server 802a, one or more of the USB-X devices 804a, 1304a, 814a may transmit signals to the local server 832 through the communication network 201 indicating that the local server 832 should send control signals to the video router 830 instructing the video router 830 to transmit source video 840a from the PACS server 802a to terminal A's display 822a. In another aspect, one or more of the USB-X devices 804a, 1304a, 814a may directly send such signals to the video router 830 instructing the video router 830 to transmit source video 840a from the PACS server 802a to terminal A's display 822a. Thus, as USB-X devices' destination addresses change as to where they direct their incoming USB data, these address changes may be propagated to the local server 832 allowing it to instruct the video server 830 to reroute video 840a, 840b . . . 840n from a USB host device 802a, 802b . . . 802n to the appropriate terminal's display(s) 822a, 824a, 826a.

Access Control

According to one aspect of the disclosure, the local server 832 also controls access between the USB host devices 802a, 802b . . . 802n and the USB peripheral devices 822a-822d, 824a, 824b, 826b, 826c. For example, the local server 832 may program the USB-X devices 804a, 804b . . . 804n, 1304a, 1304b . . . 1304n, 814a, 814b . . . 814n only with network destination addresses that they are authorized to communicate with. Network addresses outside of this authorized list may not be accessible by that particular USB-X device 804a, 804b . . . 804n, 1304a, 1304b . . . 1304n, 814a, 814b . . . 814n.

For example, referring to FIGS. 8 and 13, terminal B 812b may be a less secure terminal in that it may be located in an area that is accessible by many individuals having different security clearances or none at all. In one case, terminal B 812b may be located in an area, such as a hospital waiting room, that can be easily accessed by not just hospital staff but also the public. As such, it is desirable to limit access at terminal B 812b to exclude certain servers of the systems 800, 1300 that contain sensitive information such as detailed patient information. Assuming USB host device A 802a is a PACS server containing sensitive information, it may be desirable to exclude access to the PACS server 802a at terminal B 812b.

Consequently, the local server 832 may transmit a message and/or control signal to the Host Mode USB-X device 814b coupled to terminal B 812b indicating that the network destination address associated with the Device Mode USB-X device 804a coupled to the PACS server 802a is inaccessible. In one aspect, the Host Mode USB-X device's 814b network address memory list 710 (see FIG. 7) may include a list of network addresses that the Host Mode USB-X 814b is not authorized to access. Thus, if a user at terminal B 814b attempts to route USB communication signals from USB peripheral devices 824a, 824b associated with terminal B to the PACS server 802a using, for example, the GUI 1800 (see FIG. 18), they will receive an error message indicating that routing such signals is unauthorized. Alternatively, the GUI 1800 may show the PACS server button 1314 as grayed-out (unclickable) or alternatively it may be absent altogether as a destination host.

In another aspect, a list of network addresses that the Host Mode USB-X device 814b is unauthorized to access may be maintained at memory circuits of the local server 832. In such a case the local server 832 may check such a list first before attempting to program the network address memory circuit 710 (see FIG. 7) of the Host Mode USB-X 814b with destination addresses 718a . . . 718n that the Host Mode USB-X can route USB data to. The example provided above is not limiting to terminal B 812b. Any of the USB-X devices 804a, 804b . . . 804n, 1304a, 1304b . . . 1304n, 814a, 814b . . . 814n may be controlled by the local server 832 as to where they can send USB data and USB communication signals to.

Remote Server

Referring to FIGS. 8 and 13, a remote server 836 may be able to access the local server 832 through other networks 834 such as the Internet, local area networks, and/or wide area networks. The remote server 836 may be able to issue commands and receive information to/from every component communicatively coupled to the network 201, 901 such as the USB-X devices 804a, 804b . . . 804n, 1304a, 1304b . . . 1304n, 814a, 814b . . . 814n, the switch 805, the terminals 812a, 812b . . . 812n, the local server 832, and/or the video router 830. These commands may program the USB-X devices 804a, 804b . . . 804n, 1304a, 1304b . . . 1304n, 814a, 814b . . . 814n with lists of accessible/authorized and inaccessible/unauthorized destination addresses that the USB-X devices 804a, 804b . . . 804n, 1304a, 1304b . . . 1304n, 814a, 814b . . . 814n can or cannot send/receive network data packets to/from. These commands may also execute diagnostic routines and the information received may include diagnostic reports that may indicate any problems with the communication systems 800, 1300 including whether a USB peripheral device 822a-822d, 824a, 824b, 826b, 826c and/or a USB-X device 804a, 804b . . . 804n, 1304a, 1304b . . . 1304n, 814a, 814b . . . 814n has lost connectivity with the network.

General Considerations

Referring to FIGS. 8 and 13, the systems 800, 1300 allow the USB host devices 802a, 802b . . . 802n to not be in direct communication with the communication networks 201, 901. That is, the USB host devices 802a, 802b . . . 802n do not need to be on and/or a part of the communication networks 201, 901. This circumvents security vulnerabilities that may otherwise exist if these hosts 802a, 802b . . . 802n were forced to join the networks 201, 901. As such, the USB host devices 802a, 802b . . . 802n, which may be part of another secure network (e.g., hospital network), are able to send and receive USB data and USB communication signals to/from the USB peripheral devices 822a-822d, 824a, 824b, 826b, 826c over the communication networks 201, 901 using the USB-X devices 804a, 804b . . . 804n, 1304a, 1304b . . . 1304n, 814a, 814b . . . 814n as proxies and do not have to be a part of the networks 201, 901 themselves. Thus, in one sense the Device Mode USB-X devices 804a, 804b ... 804n, 1304a, 1304b ... 1304n to which they're coupled to act as network buffers.

According to one aspect, the USB-X devices 804a, 804b ... 804n, 1304a, 1304b ... 1304n, 814a, 814b ... 814n utilize Ethernet links that are compatible with UDP/IP or TCP/IP. This allows integration to standard Ethernet infrastructure, and thus USB communication signal routing between hosts 802a, 802b ... 802n and devices 822a-822d, 824a, 824b, 826b, 826c can be controlled by standard Ethernet switches. USB-X devices 804a, 804b ... 804n, 1304a, 1304b ... 1304n, 814a, 814b ... 814n may be powered by AC/DC mains power supply (e.g., 110V/220V wall outlet) and/or PoE (15.4 W PSE). In the event that PoE is used, it may supply the worst case USB device load of 5V*0.5 A*4=10 W.

In one aspect of the disclosure, the USB-X devices 804a, 804b ... 804n, 1304a, 1304b ... 1304n, 814a, 814b ... 814n may incorporate all of the components described herein for the Host Mode USB-X 700 and the Device Mode USB-X devices 600, 1200. Consequently, the USB-X devices 804a, 804b ... 804n, 1304a, 1304b ... 1304n, 814a, 814b ... 814n have the flexibility to operate in either Host Mode or Device Mode. The mode of operation may be controlled in a number of different way. According to one aspect, the mode of operation can be switched from between Host Mode or Device Mode manually using an I/O device 612, 712, 1212. In another aspect, the mode may be controlled and set by the local server 832 and/or the remote server 836 through the communication networks 201, 901. According to yet another aspect, the mode may be controlled and set automatically where the USB-X device 804a, 804b ... 804n, 1304a, 1304b ... 1304n, 814a, 814b ... 814n itself detects whether it is first coupled to a USB host device 802a, 802b ... 802n or a USB peripheral device 822a-822d, 824a, 824b, 826b, 826c. For example, if a USB device is coupled to the USB-X device's connector B port first the USB-X device 804a, 804b ... 804n, 1304a, 1304b ... 1304n, 814a, 814b ... 814n may enter Device Mode. Instead, if a USB device is coupled to the USB-X device's connector A port first the USB-X device 804a, 804b ... 804n, 1304a, 1304b ... 1304n, 814a, 814b ... 814n may enter Host Mode.

According to one aspect, the USB-X devices 804a, 804b ... 804n, 1304a, 1304b ... 1304n, 814a, 814b ... 814n may support a single USB host device 802a, 802b ... 802n (e.g., USB-X devices include a single USB connector B port) when operating in Device Mode. In another aspect, the USB-X devices 804a, 804b ... 804n, 1304a, 1304b ... 1304n, 814a, 814b ... 814n may each support four (4) USB peripheral devices 822a-822d, 824a, 824b, 826b, 826c (e.g., USB-X devices include four (4) USB connector A ports) when operating in Host Mode. These are merely examples. In other aspects, the USB-X devices 804a, 804b ... 804n, 1304a, 1304b ... 1304n, 814a, 814b ... 814n may support fewer or greater number of USB host devices 802a, 802b ... 802n and/or USB peripheral devices 822a-822d, 824a, 824b, 826b, 826c.

The systems 200, 800, 900, 1300 may support any USB standard including USB 1.0, USB 1.1, USB 2.0 High Speed, Full speed and Low speed modes, USB 3.0. The USB-X devices 804a, 804b ... 804n, 1304a, 1304b ... 1304n, 814a, 814b ... 814n may provide status LEDs for power ON, USB link status, Ethernet link status, activity status and Host/Device operation mode. The USB-X devices 804a, 804b ... 804n, 1304a, 1304b ... 1304n, 814a, 814b ... 814n may have enclosures that are constructed from aluminum to provide good electrical conductivity and to improve radiated electromagnetic interference (EMI) shielding. The enclosure may also provide good thermal conductivity to improve heat dissipation. According to one example, extruded enclosures may be used.

Figure 19:
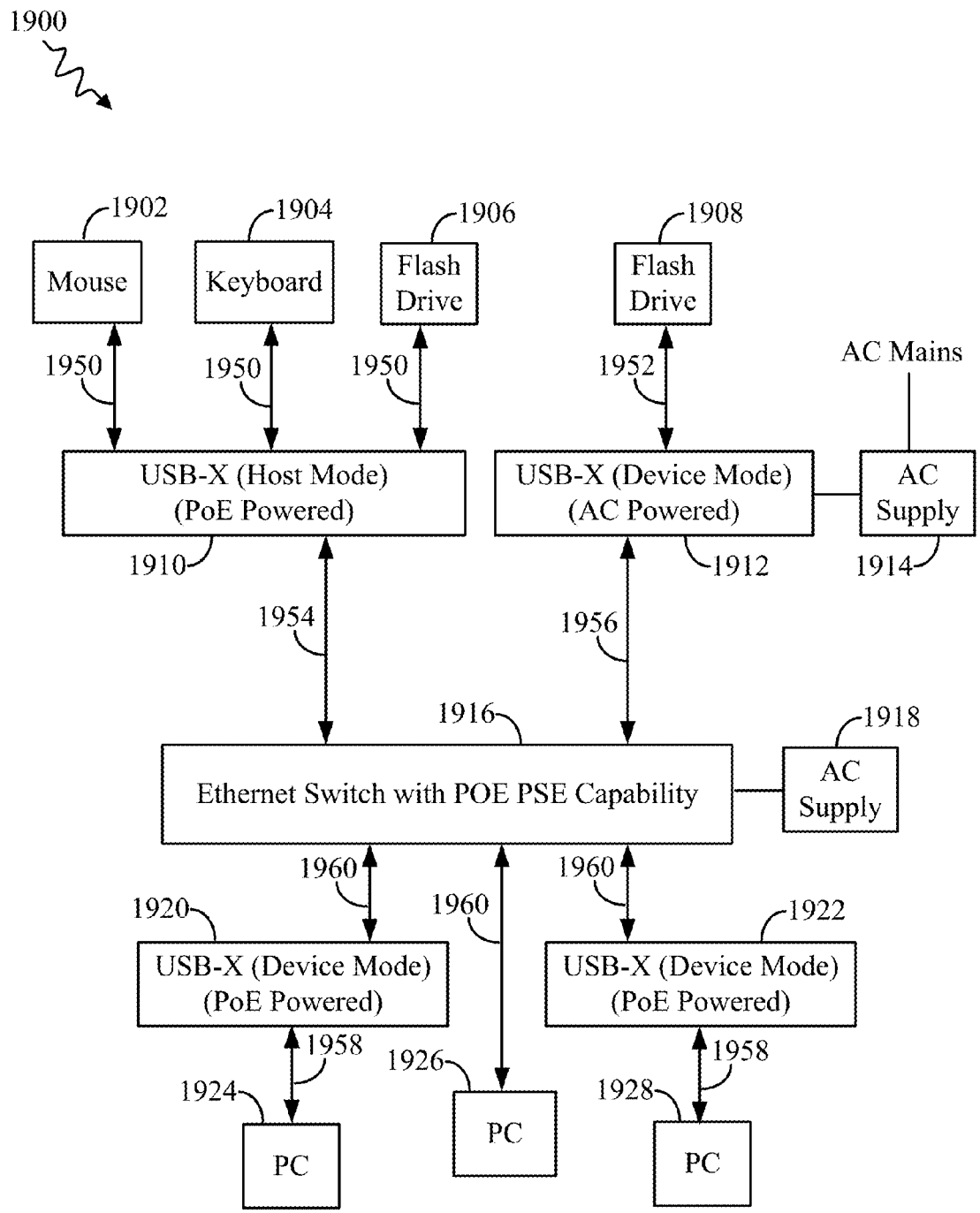
FIG. 19 illustrates a fifth exemplary schematic block diagram of a communication system for enabling long distance USB signal communication.

FIG. 19 illustrates a schematic block diagram of a communication system 1900 according to one aspect of the disclosure. The system 1900 includes a USB mouse 1902, a USB keyboard 1904, a first USB flash drive 1906, a second USB flash drive 1908, a first USB-X device 1910 operating in Host Mode, a second USB-X device 1912 operating in Host Mode, an alternating current (AC) power supply 1914, an Ethernet switch 1916, another AC power supply 1918, a first USB-X device 1920 operating in Device Mode, a second USB-X device 1922 operating in Device Mode, and a plurality of USB hosts (e.g., personal computers (PCs)) 1924, 1926, 1928. The mouse 1902, the keyboard 1904, and the first flash drive 1906 are coupled to the first USB-X device 1910 operating in Host Mode with USB cables 1950. Similarly, the second flash drive 1908 is coupled to the second USB-X device 1912 operating in Host Mode with a USB cable 1952. The first USB-X device 1910 operating in Host Mode is coupled to the Ethernet switch 1916 with a twisted pair conductor Ethernet cable 1954 (e.g., cat5, cat5e, cat6, etc.), and the second USB-X device 1912 operating in Host Mode is coupled to the Ethernet switch 1916 with a fiber optic cable 1956. The first USB-X device 1910 operating in Host Mode derives its power from the Ethernet switch using PoE, while the second USB-X device 1912 operating in Host Mode derives its power from the first AC supply 1914. Another AC supply 1918 may supply the Ethernet switch 1916 with power. The first PC 1924 and the third PC 1928 may be coupled, respectively, to the first and second USB-X devices 1920, 1922 operating in Device Mode with USB cables 1958. The second PC 1926 and the first and second USB-X devices 1920, 1922 operating in Device Mode may be coupled to the Ethernet switch 1916 with twisted pair conductor Ethernet cables 1960.

Referring to FIG. 19, the USB-X devices 1910, 1912, 1920, 1922 provide a means of connecting multiple USB hosts 1924, 1926, 1928 (e.g., PCs) to multiple USB devices 1902, 1904, 1906, 1908 (e.g., mouse, keyboard, FLASH drive). USB packets are transported between hosts and devices via Ethernet. The routing of USB packets is performed by an Ethernet switch 1916 and the configuration of the routing map is achieved by programming the desired destination IP addresses into the individual USB-Xs 1910, 1912, 1920, 1922. According to one example, a network interfacing software application can be installed on the host PCs 1924, 1926, 1928 so that the host PCs 1924, 1926, 1928 can be connected directly to the Ethernet switch 1916.

Figure 20:
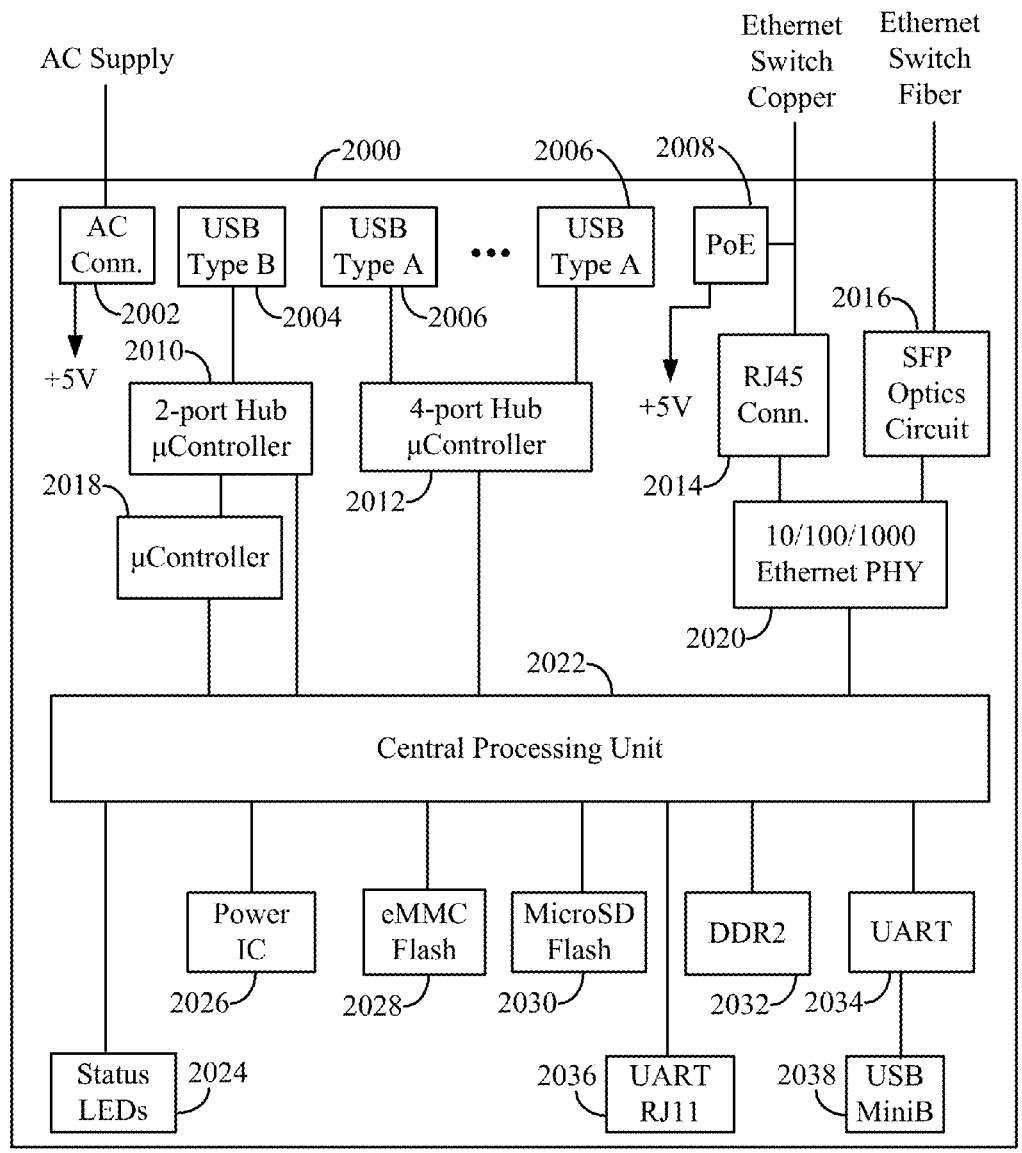
FIG. 20 illustrates a schematic block diagram of a USB extender device.

FIG. 20 illustrates a schematic block diagram of a USB-X device 2000 according to one aspect of the disclosure. The USB-X device 2000 includes components that allow it to operate in either Host Mode or Device Mode. The USB-X device 2000 may include an AC connector 2002, a USB type B connector 2004, a plurality of USB type A connectors 2006 (e.g., four such connectors), a PoE circuit 2008, a 2-port hub microcontroller 2010, a 4-port hub microcontroller 2012, an RJ45 connector 2014 with magnetics, a small form-factor pluggable (SFP) optical module/circuit 2016, a microcontroller 2018, a 10/100/1000 Ethernet physical layer module (PHY) 2020, a central processing unit (CPU) 2022 (e.g., processing circuit, processor, etc.), status LEDs 2024, a power integrated circuit (IC) 2026, an embedded multimedia card (eMMC) flash memory circuit 2028, a microSD flash card 2030, a volatile memory circuit 2032 (e.g., DDR2 memory), a universal asynchronous receiver/ transmitter (UART) circuit 3034, a UART RJ11 device 2036, and/or a USB Mini B connector 2038. The aforementioned circuit components may be interconnected according to the example shown in FIG. 20.

Figure 21:
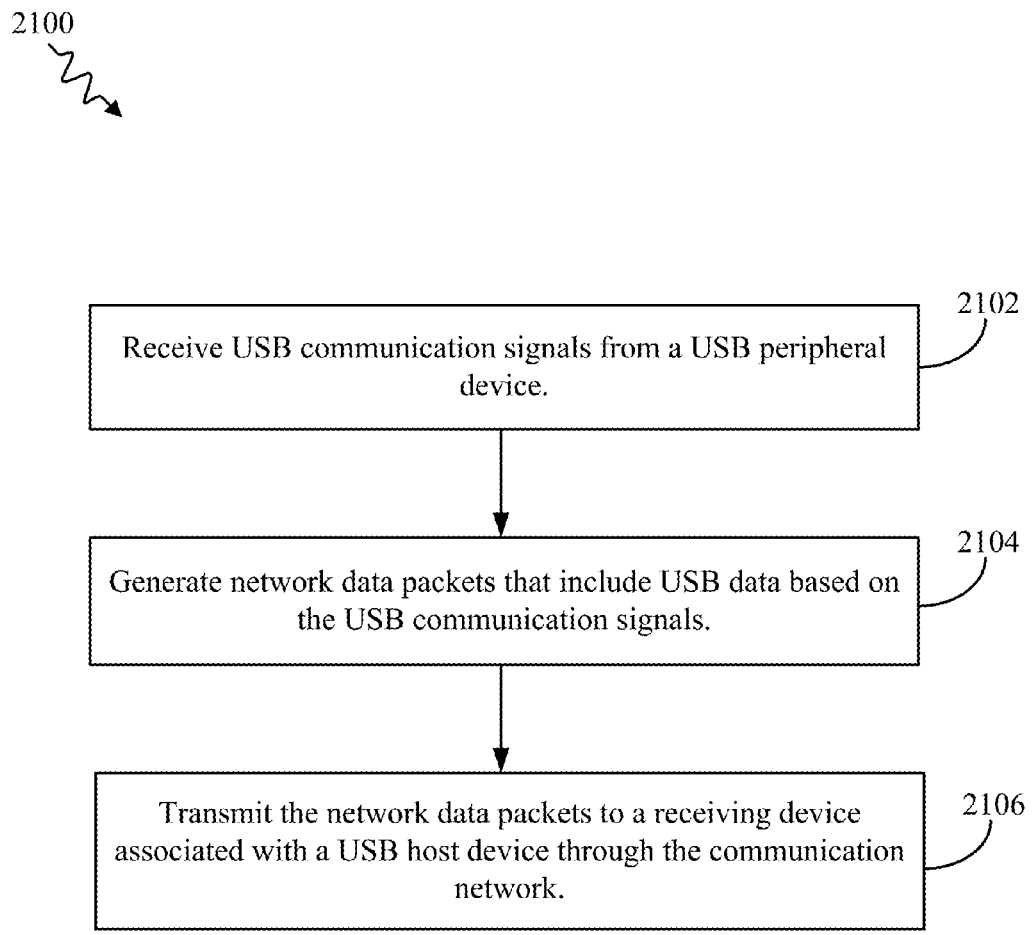
FIG. 21 illustrates a process flow diagram of a method operational at a USB extender device operating in Host Mode.

FIG. 21 illustrates a process flow diagram of a method 2100 operational at a USB-X device operating in Host Mode according to one aspect of the disclosure. First, USB communication signals are received 2102 from the USB peripheral device. Next, network data packets that include USB data based on the USB communication signals are generated 2104. Then, network data packets are transmitted 2106 to a receiving device associated with a USB host device through the communication network.

Figure 22:
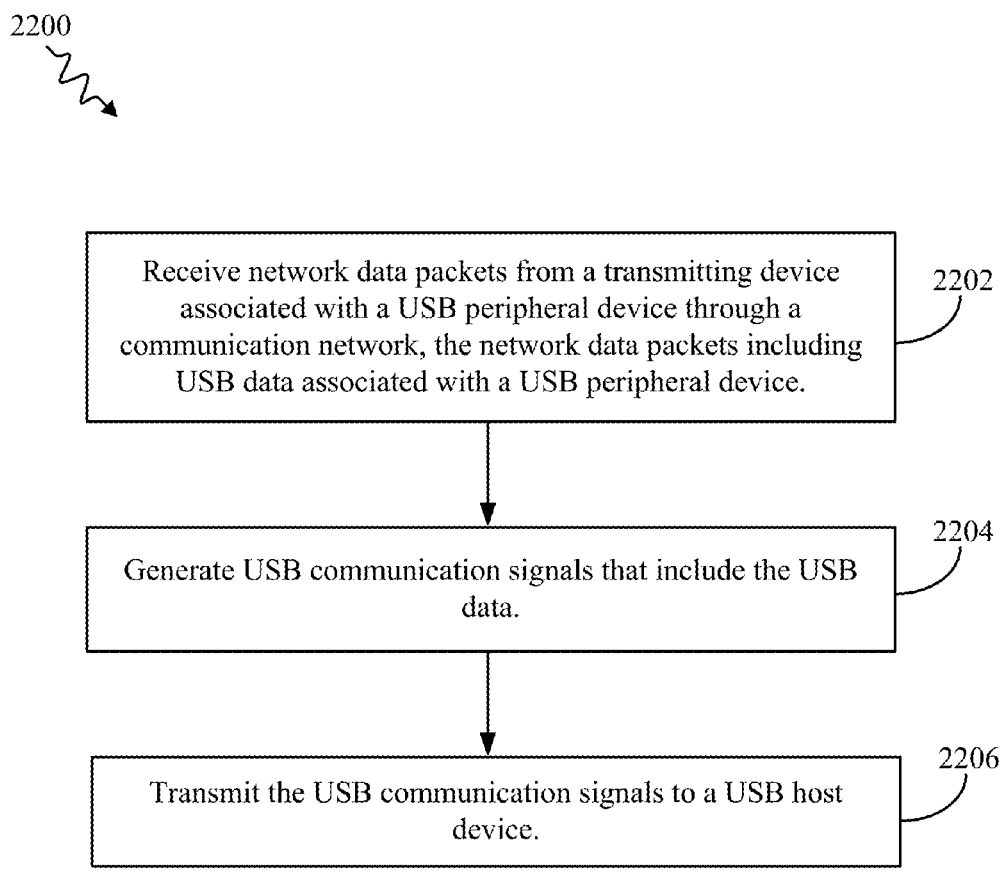
FIG. 22 illustrates a process flow diagram of a method operational at a USB extender device operating in Device Mode.

FIG. 22 illustrates a process flow diagram of a method 2200 operational at a USB-X device operating in Device Mode according to one aspect of the disclosure. First, network data packets are received 2202 from a transmitting device associated with a USB peripheral device through the communication network, where the network data packets include USB data associated with the USB peripheral device. Next, USB communication signals that include the USB data are generated 2204. Then, the USB communication signals are transmitted 2206 to the USB host device.

One or more of the components, steps, features, and/or functions illustrated in FIGS. 2, 3, 4, 5, 6, 7, 8, 9, 10, 11, 12, 13, 14, 15, 16, 17, 18, 19, 20, 21, and/or 22 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 2, 6, 7, 8, 9, 12, 13, 14, 17, 19 and/or 20 may be configured to perform one or more of the methods, features, or steps described in FIGS. 3, 4, 5, 10, 11, 15, 16, 18, 21, and/or 22. The algorithms described herein may also be efficiently implemented in software and/or embedded in hardware. The algorithms described herein may also be efficiently implemented in software and/or embedded in hardware.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing or containing instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. An apparatus comprising:
a universal serial bus (USB) communication interface adapted to communicate with at least one USB peripheral device through a USB cable connection;
a network communication interface adapted to communicate with a communication network; and
a processing circuit communicatively coupled to the USB communication interface and the network interface, the processing circuit adapted to:
receive USB communication signals from the USB peripheral device;
determine that the USB communication signals received from the USB peripheral device include at least one no-data response and at least one data-present response;
generate network data packets that include USB data based on the USB communication signals, the USB data included in the generated network data packets based on the data-present responses and excluding the no-data responses; and
transmit the network data packets to a receiving device associated with a USB host device through the communication network.

2. The apparatus of claim 1, wherein the apparatus is adapted to serve as a proxy USB host device to the USB peripheral device, and the processing circuit is further adapted to:
transmit polling messages to the USB peripheral device at substantially regular time intervals; and
receive the USB communication signals from the USB peripheral device in response to the polling messages.

3. The apparatus of claim 1, wherein the USB peripheral device is a human interface device (HID).

4. The apparatus of claim 1, wherein the USB communication interface is adapted to communicate with a plurality of USB peripheral devices, and the apparatus further comprises:
a memory circuit having a plurality of destination address modules each adapted to store a network address of one receiving device of a plurality of receiving devices, each destination address module associated with one of the plurality of USB peripheral devices, and wherein the processing circuit is further adapted to:
receive USB communication signals from the plurality of USB peripheral devices;
generate network data packets that include USB data based on the USB communication signals received from the plurality of USB peripheral devices, the network data packets each including the network address stored at the destination address module associated with the USB peripheral device from which the USB communication signals were received; and
transmit the network data packets to the network addresses included in the network data packets.

5. The apparatus of claim 4, wherein the plurality of destination address modules each store a different network address of a different receiving device, the different receiving devices associated with different USB hosts, and the network data packets are transmitted to the different receiving devices through the communication network.

6. The apparatus of claim 1, further comprising:
a memory circuit having at least one destination address module adapted to store a network address of the receiving device, and wherein the processing circuit is further adapted to:
generate the network data packets to include a destination address matching the network address stored at the destination address module; and
transmit the generated network data packets to the destination address.

7. The apparatus of claim 6, wherein the processing circuit is further adapted to:
receive a command to program the destination address module with the network address of the receiving device, the command received from at least one of a terminal associated with the apparatus and/or a server communicatively coupled to the communication network.

8. The apparatus of claim 7, wherein the terminal is adapted to display a graphical user interface (GUI) that enables a user to enter selections that route USB data from a plurality of USB peripheral devices coupled to the apparatus to a plurality of USB host devices through the communication network, and the processing circuit further adapted to:
receive the command to program the destination address module with the network address of the receiving device based on one or more selections entered at the GUI.

9. The apparatus of claim 6, wherein the destination address module is associated with the USB peripheral device, and the processing circuit further adapted to:
transmit a message to a server through the communication network, the message including the network address of the receiving device stored at the destination address module and the USB peripheral device the destination address module is associated with.

10. The apparatus of claim 1, wherein the USB peripheral device is a USB keyboard, and the processing circuit is further adapted to:
receive keyboard stroke data from the USB keyboard;
compress the keyboard stroke data using a look up table (LUT) to decrease a number of bytes representing the keyboard stroke data, and wherein the USB data is the compressed keyboard stroke data.

11. The apparatus of claim 1, wherein the USB peripheral device is a USB mouse, and the processing circuit is further adapted to:
receive USB mouse data from the USB mouse that includes button-click data and mouse movement data;
generate network data packets that include the button-click data;
transmit the network data packets that include the button-click data to the receiving device through the communication network immediately after they are generated;
accumulate the mouse movement data received for a predefined period of time before generating network data packets that include the accumulated mouse movement data; and
transmitting the network data packets that include the accumulated mouse movement data to the receiving device through the communication network.

12. The apparatus of claim 1, wherein the USB peripheral device is a USB mouse, and the processing circuit is further adapted to:

receive mouse movement data from the USB mouse that includes x-y coordinates indicative of relative movement of the USB mouse, the x-y coordinates having an associated maximum and minimum x-coordinate value and a maximum and minimum y-coordinate value;

accumulate the mouse movement data for a predefined period of time, the predefined period of time greater than 5 milliseconds;

transmit the accumulated mouse movement data to the receiving device through the communication network when the predefined period of time has lapsed or sooner if the accumulated mouse movement data includes an x-coordinate value equal to either the maximum or minimum x-coordinate value or a y-coordinate value equal to either the maximum or minimum y-coordinate value.

13. The apparatus of claim 1, wherein the USB peripheral device is a touchscreen display, and the processing circuit is further adapted to:

receive touchscreen press/de-press data and touchscreen movement data from the touchscreen display;

generate network data packets that include the touchscreen press/de-press data;

transmit the network data packets that include the touchscreen press/de-press data to the receiving device through the communication network immediately after they are generated;

accumulate the touchscreen movement data received for a predefined period of time before generating network data packets that include the accumulated touchscreen movement data; and transmitting the network data packets that include the accumulated touchscreen movement data to the receiving device through the communication network.

14. An apparatus comprising:

a universal serial bus (USB) communication interface adapted to communicate with a USB host device through a USB cable connection;

a network communication interface adapted to communicate with a communication network; and a processing circuit communicatively coupled to the USB communication interface and the network interface, the processing circuit adapted to:

receive network data packets from a transmitting device associated with a USB keyboard through the communication network, the network data packets including USB data associated with the USB keyboard;

determine that the USB data is compressed USB keyboard data;

reconstruct uncompressed USB keyboard data by decompressing the compressed USB keyboard data using a reverse look up table (LUT);

generate USB communication signals that include the uncompressed USB keyboard data; and transmit the USB communication signals that include the uncompressed USB keyboard data to the USB host device.

15. The apparatus of claim 14, wherein the apparatus is adapted to serve as a proxy USB peripheral device to the USB host device, and the processing circuit is further adapted to:

receive polling messages from the USB host device at substantially regular time intervals; and transmit the USB communication signals to the USB host device in response to the polling messages.

16. A system comprising:

a first universal serial bus extender (USB-X) adapted to couple to at least one universal serial bus (USB) peripheral device;

a second USB-X adapted to couple to a USB host device, the second USB-X communicatively coupled to the first USB-X through a packet switching network; and a server communicatively coupled to the first USB-X and the second USB-X through the packet switching network, and the server is adapted to:

receive a request to route USB communication signals from the USB peripheral device to the USB host device;

determine that the USB peripheral device is coupled to the first USB-X;

determine that the USB host device is coupled to the second USB-X;

obtain a network address of the second USB-X; and transmit a command to the first USB-X to program a destination address module of the first USB-X with the network address of the second USB-X;

wherein the first USB-X is further adapted to serve as a proxy USB host device to the USB peripheral device, receive USB communication signals from the USB peripheral device, generate network data packets that include USB data based on the USB communication signals received, the network data packets generated to include the network address of the second USB-X stored at the destination address module, and transmit the network data packets to the second USB-X through the packet switching network based on the network address of the second USB-X included in the network data packets.

17. The system of claim 16, wherein the second USB-X is further configured to:

serve as a proxy USB peripheral device to the USB host device;

receive the network data packets that include the USB data from the first USB-X;

generate USB communication signals that include the USB data; and transmit the USB communication signals to the USB host device.

18. The system of claim 16, wherein the request is received based on a selection made by a user operating a graphical user interface (GUI) associated with the server.

19. The system of claim 16, further comprising:

a video router communicatively coupled to the first USB-X, the second USB-X, and the server through the packet switching network, the video router adapted to route video signal data from the USB host device to a destination display associated with the USB peripheral device; and wherein the server is further adapted to:

transmit a command to the video router instructing the video router to route the video signal data from the USB host device to the destination display associated with the USB peripheral device.

20. The system of claim 16, wherein the server is further adapted to:

transmit a list of network addresses to the first USB-X that the first USB-X is unauthorized to transmit the USB data to.

21. The system of claim 16, further comprising:
a remote server communicatively coupled to the server through a wide area network (WAN), the remote server adapted to:
  transmit a message to the server instructing the server to conduct a diagnostic routine that determines if the first USB-X, the second USB-X, and/or the server are operating correctly; and
  receive a response to the message including a diagnostics report that indicates results of the diagnostic routine.

22. The system of claim 16, wherein the first USB-X is further adapted to:
determine that the USB communication signals received from the USB peripheral device include at least one no-data response and at least one data-present response; and
wherein the USB data included in the generated network data packets is based on the data-present responses and excludes the no-data responses.

23. An apparatus comprising:
a universal serial bus (USB) communication interface adapted to communicate with a USB host device through a USB cable connection;
a network communication interface adapted to communicate with a communication network; and
a processing circuit communicatively coupled to the USB communication interface and the network interface, the processing circuit adapted to:
  receive network data packets from a transmitting device associated with a USB mouse through the communication network, the network data packets including USB data associated with the USB mouse;
  determine that the USB data included in the network data packets is USB mouse data, the USB mouse data including button-click data and mouse movement data;
  determine that the mouse movement data is temporally compressed according to a predefined periodic time rate;
  generate USB communication signals that include the mouse movement data; and
  transmit the USB communication signals that include the mouse movement data to the USB host device according to the predefined periodic time rate.

\* \* \* \* \*